US012340358B2

(12) United States Patent
Dorch et al.

(10) Patent No.: US 12,340,358 B2
(45) Date of Patent: Jun. 24, 2025

(54) ARTIFICIAL INTELLIGENCE (AI) ORDER TAKING SYSTEM ENABLING AGENTS TO MAKE CORRECTIONS VIA POINT OF SALE (POS) DEVICES

(71) Applicant: ConverseNowAI, Austin, TX (US)

(72) Inventors: Jon Dorch, Austin, TX (US); Zubair Talib, Irvine, CA (US); Ruchi Bafna, Bengaluru (IN); Akshaya Labh Kayastha, Karnataka (IN); Yuganeshan Aj, Karnataka (IN); Vinay Kumar Shukla, Austin, TX (US); Rahul Aggarwal, Austin, TX (US)

(73) Assignee: ConverseNowAI, Austin, TX (US)

( * ) Notice: Subject to any disclaimer, the term of this patent is extended or adjusted under 35 U.S.C. 154(b) by 477 days.

(21) Appl. No.: 17/746,931

(22) Filed: May 17, 2022

(65) Prior Publication Data

US 2022/0277282 A1 Sep. 1, 2022

Related U.S. Application Data

(63) Continuation-in-part of application No. 17/184,207, filed on Feb. 24, 2021, now Pat. No. 11,810,550.

(51) Int. Cl.
*G06Q 20/20* (2012.01)
*G06N 20/00* (2019.01)
*G06Q 30/0601* (2023.01)

(52) U.S. Cl.
CPC ......... *G06Q 20/203* (2013.01); *G06N 20/00* (2019.01); *G06Q 20/202* (2013.01); *G06Q 30/0601* (2013.01)

(58) Field of Classification Search
CPC ............. G06Q 20/203; G06Q 20/202; G06Q 30/0601; G06Q 30/0631; G06Q 30/0238; G06Q 30/0268; G06N 20/00; G06N 5/041; G06N 3/045; G06F 18/22; G06F 18/23; G06F 18/24; G06F 16/00; G06F 16/903; G06F 40/279; G06V 40/172;
(Continued)

(56) References Cited

U.S. PATENT DOCUMENTS 11,037,549 B1 * 6/2021 Kulkarni ............. G10L 15/1815
2013/0297496 A1 * 11/2013 Cloran ................. G06Q 30/016
705/39

(Continued)

*Primary Examiner* — Avia Salman
(74) *Attorney, Agent, or Firm* — Shiv S. Naimpally; Flagship Patents

(57) ABSTRACT

A software agent, comprising a machine learning algorithm trained to engage in a conversation with a customer to take an order, receives an utterance from a customer. The utterance is converted to text and an analysis of the text performed. If the software agent determines, based on the analysis, that the software agent is untrained to respond to the text, the software agent establishes a connection to a point-of-sale device associated with a human agent. The human agent may perform a modification (e.g., an edit to the text, a modification to a cart, or provide input) to a modifiable portion displayed by the point-of-sale device. The software agent, based at least in part on the modification, resumes the conversation with the customer. The human agent does not directly interact with the customer during the conversation between the software agent and the customer.

20 Claims, 8 Drawing Sheets

(58) Field of Classification Search
CPC ........ G07B 2017/00225; G07G 1/0009; H04L 51/02; H04L 51/08
USPC .......................................................... 705/28
See application file for complete search history.

(56) References Cited

U.S. PATENT DOCUMENTS

2015/0193857 A1\* 7/2015 Reed .................. G06Q 30/0633
705/26.8
2017/0148073 A1\* 5/2017 Nomula ............. G06Q 30/0629

\* cited by examiner

ARTIFICIAL INTELLIGENCE (AI) ORDER TAKING SYSTEM ENABLING AGENTS TO MAKE CORRECTIONS VIA POINT OF SALE (POS) DEVICES

CROSS-REFERENCE TO RELATED APPLICATIONS

The present patent application is a continuation-in-part (CIP) of U.S. patent application Ser. No. 17/184,207, filed on Feb. 24, 2021, entitled "DETERMINING ORDER PREFERENCES AND ITEM SUGGESTIONS", which is incorporated by reference herein in its entirety and for all purposes as if completely and fully set forth herein.

BACKGROUND OF THE INVENTION

Field of the Invention

This invention relates generally to systems to using artificial intelligence (machine learning) to provide an automated speech recognition system and more particularly to, while the artificial intelligence is taking an order from a customer, enabling a human agent to make corrections to a text-based transcription of a customer's utterances, a cart that includes one or more items being ordered by the customer, or a combination of both, without the customer being aware of the human agent's presence.

Description of the Related Art

Restaurants are continually struggling to keep prices low to make items affordable and on par with competitor pricing. One of the major costs associated with a restaurant is labor. For example, one employee of the restaurant may take an order from a customer and one or more additional employees may prepare and package the food for eat-in, carry out, or delivery. Automating tasks, such as order taking, using a system that includes automatic speech recognition (ASR), may reduce labor costs.

However, if the ASR system is unable to understand what a customer is saying, the ASR system may make a mistake in the order or repeatedly ask the customer to clarify, resulting in customer dissatisfaction. At the very least, the customer may ask for a human agent to take over from the ASR system to take the customer's order.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A software agent, comprising a machine learning algorithm trained to engage in a conversation with a customer to take an order, receives an utterance from a customer. The utterance is converted to text and an analysis of the text performed. If the software agent determines, based on the analysis, that the software agent is untrained to respond to the text, the software agent establishes a connection to a point-of-sale device associated with a human agent. The human agent may perform a modification (e.g., an edit to the text, a modification to a cart, or provide input) to a modifiable portion displayed by the point-of-sale device. The software agent, based at least in part on the modification, resumes the conversation with the customer. The human agent does not directly interact with the customer during the conversation between the software agent and the customer.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
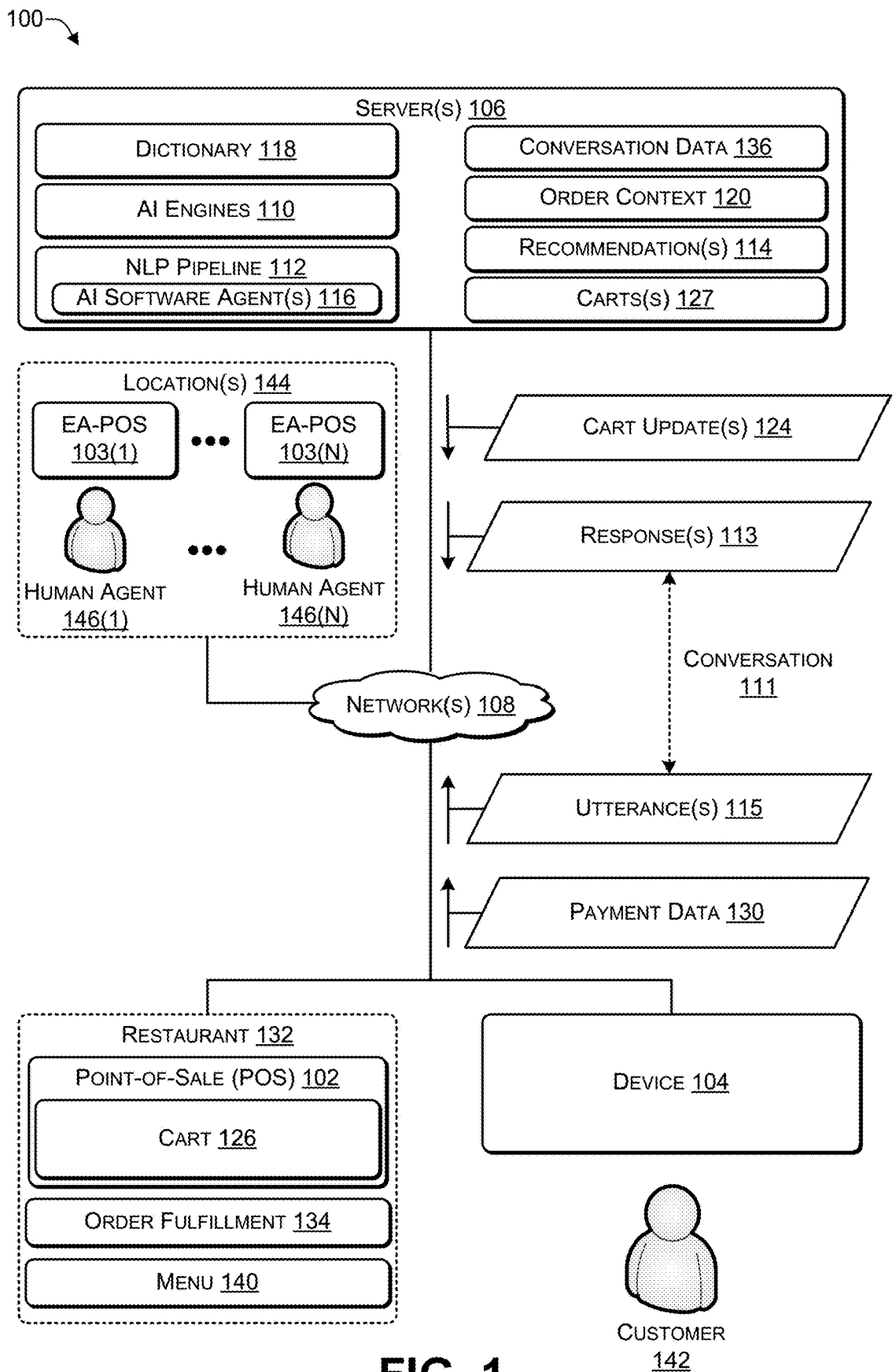
FIG. 1 is a block diagram of a system that includes a server to host artificial intelligence (AI) based software agents, according to some embodiments.

U.S. patent application Ser. No. 17/184,207 describes a system in which a machine learning algorithm (e.g., an artificial intelligence (AI) engine) monitors a conversation between a customer and an employee at a restaurant. As the system is monitoring the conversation, the system interacts with a point-of-sale (POS) terminal to add, subtract, modify, or any combination thereof the contents of a cart. For example, if the customer is placing an order for one or more food items, the system may automatically add contents to the cart based on the customer's voice input. To illustrate, if the customer says "Two large pepperoni pizzas" then the system automatically (e.g., without human interaction) adds two large pepperoni pizzas to the cart. Thus, the employee verbally interacts with the customer, without interacting with the point-of-sale terminal, and with the system interacting with the point-of-sale terminal. The employee observes the system modifying the contents of the cart while the employee is verbally interacting with the customer. The employee may interact with the point-of-sale terminal to make corrections if the system makes an error. The system may provide upsell suggestions to the employee to provide to the customer. The upsell suggestions may include increasing a size of an item ordered by the customer (e.g., "Would you like an extra-large instead of a large for just two dollars more?", adding an item (e.g., "Would you like to add something to drink?"), or both. The upsell suggestions may be provided to the employee via, for example, audibly (e.g., via an earpiece) or visually (e.g., displayed on the point-of-sale terminal). In addition, the system may be used to train new employees by prompting them as to what to say to the customer during a conversation to take an order. The POS is also referred to herein as an employee assist POS (EA-POS).

The conversation data that includes the verbal interaction between the employee and the customer when the customer is placing an order is archived. The conversation data is used to train an AI engine to provide a software agent (e.g., also referred to as a "chat bot"). By using a large quantity of conversation data between human employees and human customers to train the software agent, the software agent is able to mimic the way in which a human employee takes an order in such a way that the human customer may be unaware that they are interacting with a software agent rather than a human employee. The term human employee refers to any human employed on behalf of the commerce company to take orders, including employees (including contractors and the like) at a call center run by the commerce site or a 3rd party. In this way, a human employee is replaced by a software agent to take an order from a customer, thereby saving the restaurant money and increasing profit margins.

When a customer calls a restaurant to place an order, an AI-based software agent ("software agent") in the conversational order taking system ("system") initiates a conversation with the customer in which the customer makes a series of utterances and the software agent responds to the utterances. As each customer utterance is received, the utterance is converted to text (as described herein) and the text displayed on a first point-of-sale (POS) terminal. If the software agent determines that the customer utterance includes a menu item that the customer desires to order, the software agent adds the item to the customer's cart on the first EA-POS terminal.

In some cases, the software agent may encounter a situation that does not allow the order to be completed. For example, the software agent may ask the customer to provide particular information but may not understand the customer's utterances. For example, for a pizza, the particular information may be a modifier to the pizza, such as a size (e.g., small, medium, large, or extra-large) of the pizza, the type of crust (e.g., thick crust, thin crust, pan crust, stuffed crust, or the like), the type of sauce (e.g., marinara sauce, arrabbiata sauce, white sauce, or the like), the toppings, and other types of modifiers. Rather than repeatedly asking the customer to provide the particular information, when the software agent determines that the software agent cannot complete the order, the system initiates a connection to a second point-of-sale (POS) terminal that is being viewed by a human agent. The second EA-POS terminal mirrors the first EA-POS terminal, e.g., everything displayed on the first EA-POS terminal is displayed, substantially simultaneously, on the second EA-POS terminal. The human agent is able to view and modify, via the second EA-POS, the text-based transcriptions of the customer's utterances and the cart contents. While the software agent continues to engage in conversation with the customer, the human agent is able to modify the transcription, the cart contents, or both. In this way, the human agent is able to correct errors in the transcription of the customer's utterances. In addition, after the software agent modifies the contents of a cart in response to the customer's utterances, the human agent is able to correct the contents of the cart. The human agent is able to make changes to the transcription of the utterances and to the cart contents without the customer being aware that a human agent is listening in to the conversation between the software agent and the customer. Of course, the human agent is able to take over from the software agent under particular circumstances (e.g., software issue, hardware issue, or the like).

The data that is generated by each order, including the customer's utterances (e.g., audio), the text (e.g., created based on a transcription of the customer's utterances), the software agent's modifications to the contents of a cart based on the text, and the corrections made by the human agent to the text and to the contents of the cart are stored and used at a later date as training data to retrain one or more machine learning algorithms. In this way, the automatic speech recognition (ASR) algorithm that converts speech (e.g., the customer's utterances) to text and the software agent's modifications to the contents of the cart based on the text may be continually improved by the retraining to improve the accuracy of (i) the ASR algorithm and (ii) the AI-based software agent.

As an example, a server includes one or more processors and one or more non-transitory computer readable media to store instructions. The instructions are executable by the one or more processors to perform various operations. For example, a software agent executing on the server may receive an utterance from a customer. The software agent comprises a machine learning algorithm trained to engage in a conversation with the customer to take an order. The utterance is converted to text. If the software agent determines that the software agent is untrained to respond to the text, the software agent initiates a connection to a point-of-sale (POS) device that is associated with a human agent. The POS device may receive, from the human agent, a modification to a modifiable portion being displayed by the POS device. The modification to the modifiable portion displayed by the POS device may include: (i) one or more edits, by the human agent, to the text, (ii) one or more modifications, by the human agent, to a cart associated with the customer, (iii) text input provided by the human agent in an input area for the software agent to provide as a verbal response to the customer, or any combination thereof. The modification to the modifiable portion is provided to the software agent. The software agent may resume the conversation with the customer based at least in part on the modification. For example, the software agent may verbally provide a response to the customer based at least in part on the modification. The human agent does not directly interact (e.g., engage) with the customer during the conversation between the software agent and the customer.

The software agent may receive an additional utterance from the customer. The additional utterance may be converted to additional text and provided to the software agent. The software agent may modify the order based at least in part on the additional text to create a modified order. For example, modifying the order may include (i) adding an item to the order, (ii) modifying (including deleting) a previously added item in the order, or any combination thereof. The POS device may display the additional text and the modified order. The software agent may verbally provide a response to the customer based at least in part on the additional text. When the software agent determines that the customer has completed the order, the software agent processes the order data and initiates fulfillment of the order.

FIG. 1 is a block diagram of a system that includes a server to host artificial intelligence (AI) based software agents. The system 100 includes a representative point-of-sale (EA-POS) device 102, a device 104, and one or more server(s) 106 connected to each other via one or more network(s) 108. The server 106 may include multiple AI engines 110 (e.g., using one or more machine learning algorithms), a natural language processing (NLP) pipeline 112, and one or more software agents 116. Each software agent 116 may have a corresponding cart 127 that each software agent 116 updates when taking an order from a customer, such as the representative customer 142.

The device 104 may be a smartphone or tablet associated with a customer 142, a kiosk located near a restaurant 132, an order post, a device accessible in a drive-through lane, or another type of device that is capable of receiving an order from the customer 142. The customer 142 may use the device 104 to initiate an order to a commerce site, such as a restaurant 132. A restaurant is used merely as an example and it should be understood that the systems and techniques described herein can be used for other types of commerce, such as ordering groceries, ordering non-perishable items and the like.

In a data gathering phase, a human employee may receive the order and the AI engine 110 may monitor the conversation 111, including utterances 115 of the customer 142 and responses 113. The utterances 115 are the raw audio as uttered by the customer 142. Initially, the responses 113 may be from a human employee of the restaurant 132. The AI engine 110 may determine which items from a menu 140 of the restaurant 132 the customer 142 is ordering. The AI engine 110 may monitor the conversation 111 between the customer 142 and the employee and automatically (without human interaction) modify a cart 126 hosted by the POS device 102. In other cases, a human employee may receive the order, the AI engine 110 may monitor the conversation between the customer 142 and the employee, and monitor what the employee enters into the POS device 102. The employee entries may be used as labels when training the AI engine 110 and various machine learning (ML) models in the NLP pipeline 112. The AI engine 110 may use a dictionary 118 to identify words in the conversation. The AI engine 110 may keep a running track of an order context 120 associated with each particular order. The order context 120 may include order data associated with previously placed orders by each customer 142, trending items in a region in which the customer 142 is located, specials/promotions (e.g., buy one get one free (BOGO), limited time specials, regional specials, and the like) that the restaurant 132 is currently promoting (e.g., on social media, television, and other advertising media), and other context-related information. The order context 120 may include user preferences, such as gluten allergy, vegan, vegetarian, or the like. The user may specify the preferences or the AI engines 110 may determine the preferences based on the customer's order history. For example, if the customer 142 orders gluten-free products more than once, then the AI engines 110 may determine that the customer 142 is gluten intolerant and add gluten intolerance to the customer's preference file. As another example, if the customer 142 orders vegan or vegetarian items (or customizes menu items to be vegan or vegetarian) then the AI engines 110 may determine that the customer 142 is vegan or vegetarian and add vegan or vegetarian to the customer's preference file. The cart 126 may include other information as how the order is to be fulfilled (e.g., pickup or delivery), customer address for delivery, customer contact information (e.g., email, phone number, etc.), and other customer information.

The customer 142 may use a payment means, such as a credit card, debit card, or other type of payment means, to provide payment data 130 to complete the order. In response, the restaurant 132 may initiate order fulfillment 134 that includes preparing the ordered items for take-out, delivery, or in-restaurant consumption. Such conversations between human employees and customers may be stored as conversation data 136. In a training phase, the conversation data 136 is used to train an artificial intelligence (AI), such as a machine learning algorithm. In a production phase, multiple instances of the AI may be used to create the AI-based software agents 116 to take orders from customers in a manner similar to a human employee, such that the customers may be unaware that they are interacting with the software agent 116 rather than a human employee.

Subsequently (e.g., after the AI underlying the AI-based software agents 116 has been trained using the conversation data 136), when the customer 142 uses the device 104 to initiate a communication to the restaurant 132 to place an order, the communication may be routed to the software agent 116 (e.g., rather than to a human employee). The customer 142 may have a conversation 111 that includes utterances 115 of the customer 142 and responses 113 by the software agent 116. Typically, the conversation 111 does not include a human agent.

If the AI-based software agent 116 encounters particular situations in which the software agent 116 is unable to complete the conversation 111 (e.g., complete taking the customer's order), then the software agent 116 may escalate by creating a connection to one of employee assist point-of-sale (EA-POS) 103(1) to 103(N) associated with one of human agents 146(1) to 146(N) (N>0). The human agents 146 may be located at one or more locations 144 that are remote (e.g., geographically distant) relative to a location of the restaurant 132. For example, the locations 144 may include locations in a different city, a different county, a different state, or a different country from where the restaurant 132 is located. The EA-POS 103 may be connected (e.g., via the networks 108) to the POS 102 to enable the human agent 146 to view the cart 127 and conversation data 136, including a text-based transcription (created using automatic speech recognition (ASR)) of a most recent of the utterances 115. The human agent 146 may view the text-based transcription and (1) edit the text-based transcription, (2) edit the contents of the cart 126, or (3) provide input into an input area (e.g., text box) that the AI-based software agent 116 verbally provides (e.g., via text-to-speech) to the customer 142 (e.g., as one of the responses 113). The human agent 146 thus enables the AI-based software agent 116 to complete the conversation 111 with the customer 142 and initiate order fulfillment 134, without the human agent 146 directly engaging in conversation with the customer 142. The human agent 146 may take over from the AI-based software agent 116 and directly engage in a conversation with the customer 142 if a situation is encountered where the AI-based software agent 116 cannot complete the conversation 111 even after the human agent 146 has (1) edited the text-based transcription, (2) edited the contents of the cart 126, (3) provided input into an input area (e.g., text box) that the AI-based software agent 116 verbally provides to the customer 142, or any combination thereof. For example, the human agent 146 may take over from the AI-based software agent 116 and directly engage in a conversation with the customer 142 if a software or hardware issue is encountered or the like.

The conversation 111 may include voice, text, touch input, or any combination thereof. For example, in some cases, the conversation 111 may include the voice of the customer 142 and the responses 113 of the software agent 116 may be vocalized (e.g., converted into a synthesized voice) using text-to-speech technology. The conversation 111 may include text input and/or touch input in which the customer 142 enters order information using a website, an application ("app"), a kiosk, or the like. One or more of the utterances 115 may result in the server 106 sending a cart update 124 to update a cart 126 at the point-of-sale device 102. The AI engine 110 may determine (e.g., predict) recommendations 114 that the software agent 116 provides in the responses 113 as part of the conversation 111. For example, the recommendations 114 may be based on items that the customer 142 has previously ordered, items that are currently popular in the customer's region (e.g., zip code, city, county, state, country, or the like), and the like. To determine items that the customer 142 previously ordered, the AI engine 110 may determine an identity of the customer 142 based on, for example, an identifier (e.g., a phone number, an Internet protocol (IP) address, caller identifier, or the like) associated with the device 104, voice recognition, facial recognition (e.g., in the case of a video call), or another identifying characteristic associated with the order initiated by the device 104.

After the customer 142 has completed an order, the customer 142 may provide payment data 130, for example using an account (e.g., bank account, credit card account, debit card account, gift card account, or the like). The payment data 130 may be sent to the point-of-sale device 102 to complete a checkout process for the cart 126. After the payment data 130 has been received and the payment data processed, the restaurant 132 may initiate order fulfillment 134, such as preparing the items in the order for take-out, delivery, in-restaurant dining, or the like.

Thus, the system 100 includes an automated ordering system to enable customers to initiate and complete an order using voice, written text, or commands entered via a user interface (UI) provided by a website, an application ("app") or the like. The system 100 is configured to enable the interactions between human customers and software agents 116 to be natural and human-like to such a degree that the human customers may conclude that they interacted with a human rather than a software agent. Thus, in so far as ordering food from a restaurant is concerned, the software agents 116 may pass the Turing test. The software agents 116 engage in human-like conversations in which the software agents 116 exhibit flexibility in the dialog. The software agents 116 are trained, based on the conversation data, to have an understanding of complex natural language utterances that take into account the nuances of oral and written communications, including both formal communications and informal communications. The term 'utterance' may include anything spoken or typed by a customer, including a word, a phrase, a sentence, or multiple sentences (including incomplete sentences that can be understood based on the context).

The system 100 includes a voice ordering system that takes the utterances 115 of a customer and processes the utterances 115 through the Natural Language Processing (NLP) pipeline 112 (also referred to as a Natural Language Understanding (NLU) pipeline). The output of the NLP pipeline 112 are used by the server 106 to select: (1) a next one of the responses 113 that the software agent 116 provides the customer in the conversation 111 and (2) the cart updates 124 to update the cart 126.

The systems and techniques described herein provide a data-driven approach to the NLP pipeline 112. The conversation data 136 includes hundreds of thousands of conversations between a human customer and a human employee and is used to train a supervised machine learning model (e.g., the software agents 116) to make the responses 113 of the software agents 116 as human-like as possible. The conversation data 136 includes human-to-human conversations used to train a domain specific language model (e.g., the software agents 116). The systems and techniques described herein take advantage of newly available language models that provide a greater capacity for leveraging contextual information over the utterances 115 (e.g., a word, a phrase, a sentence, or multiple sentences including incomplete sentences).

Thus, in a data gathering phase, an AI engine may listen in on conversations between customers and human employees and automatically populate and modify a cart associated with an order that each customer is placing. The AI engine may automatically provide suggestions to the human employees on up-selling (e.g., adding items, increasing a size of ordered items, or both). The conversation data between customers and human employees may be stored to create a database of conversations associated with, for example, ordering food at a restaurant or another type of commerce site. The database of conversation data may be gathered over multiple months or years and used to train a machine learning algorithm, such as a software agent, to automatically take an order from a customer as if the customer was having a conversation with a restaurant employee. For example, given a conversation context and an utterance from the customer, the software agent determines and verbalizes (e.g., using text-to-speech) an appropriate and automated response using a natural language processing pipeline. The conversation data may be periodically used to retrain the machine learning on which the software agents are based to improve their accuracy. If a software agent is unable to complete a conversation, e.g., because the software agent is unable to understand what the customer is saying, then the software agent may escalate by connecting the software agent's EA-POS to the EA-POS of a human agent located in a remote location relative to the restaurant. The human agent may work in the background by, for example, editing the text transcription of the customer's utterances, modifying cart contents, or instructing the software agent to speak words (e.g., ask questions) typed by the human agent. While the human agent is performing these actions in the background, the software agent continues to engage in a conversation with the customer and completes the conversation (e.g., completes taking the order) without the customer being aware that a human agent was involved.

Figure 2:
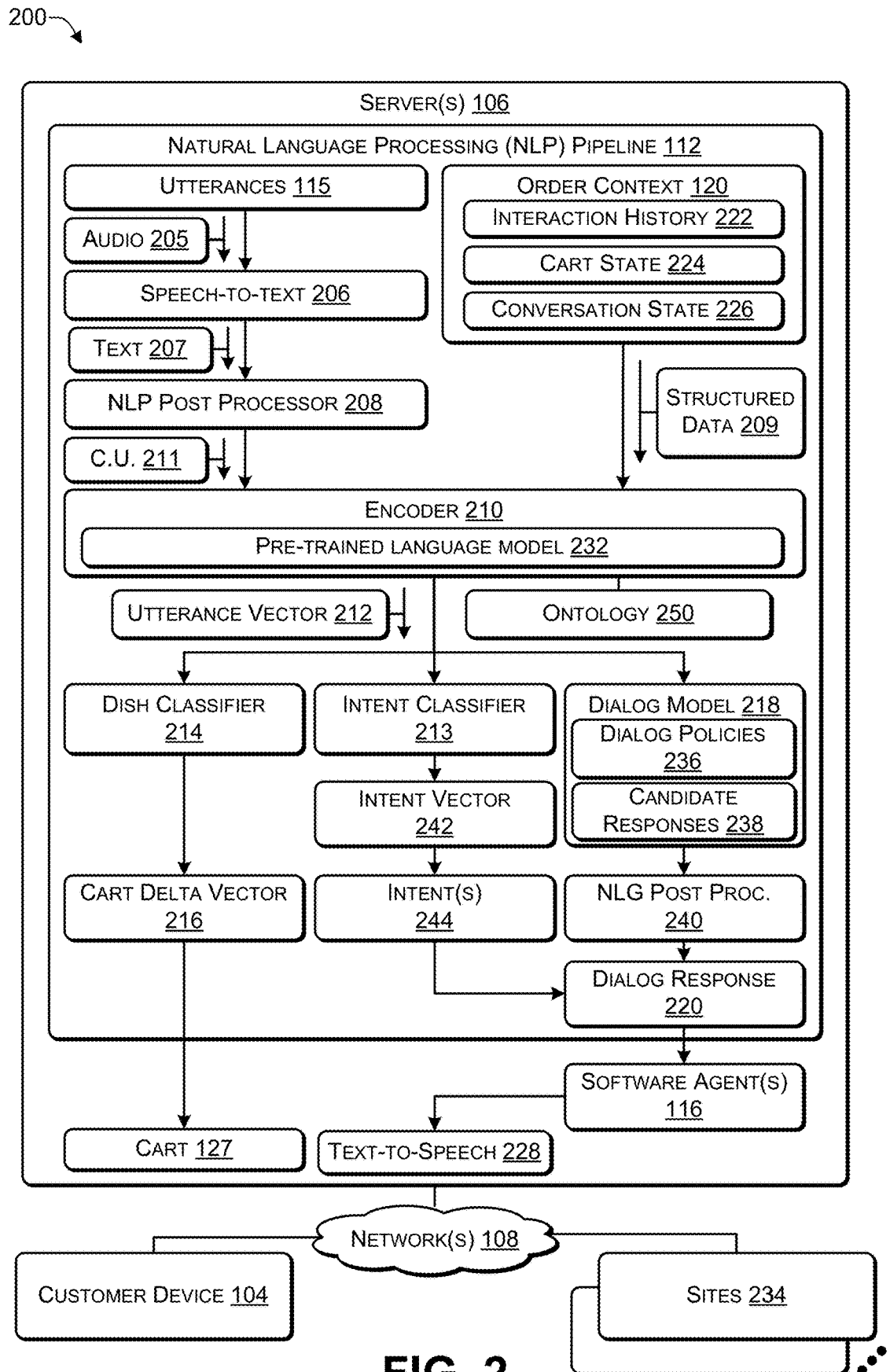
FIG. 2 is a block diagram of a natural language processing (NLP) pipeline, according to some embodiments.

FIG. 2 is a block diagram 200 of the natural language processing (NLP) pipeline 112 of FIG. 1, according to some embodiments. The NLP pipeline 112 may receive the utterances 115 of a customer (e.g., from the customer device 104 of FIG. 1). The NLP pipeline 112 may process audio data 205 that includes at least a portion of the utterances 115 using a speech-to-text 206 to convert the audio data 205 to text 207. For example, the utterances 115 may be "I would like 2 large pizzas with pepperoni and mushrooms."

The order context 120 may include an interaction history 222 between the software agent 116 and the customer, a current cart state 224, and a conversation state 226. The interaction history 222 may include interactions between the customer and one of the software agents 116, including the utterances 115 of the customer and the responses 113 of the software agent 116. The cart state 224 identifies a state of the customer's cart including, for example, items in the cart, how many of each item is in the cart, a price associated with each item, a total price associated with the cart, whether payment has been received (e.g., whether the cart has been through check out), a most recent change (e.g., addition, subtraction, or modification) to one or more items in the cart, other cart related information, or any combination thereof. The conversation state 226 may indicate a state of the conversation between the customer and the software agent 116, such as whether the conversation is in progress or has concluded, whether the customer is asked a question and is waiting for a response from the software agent 116, whether the software agent 116 has asked a question and is waiting for a response from the customer, a most recent utterance from the customer, a most recent response from the software agent 116, other conversation related information, or any combination thereof.

The utterances 115 are provided by a customer that has contacted the restaurant 132 of FIG. 1 to place an order. The utterances 115 are in the form of the audio data 205. The speech-to-text 206 converts the audio 205 into text 207. The text 207 is processed using an NLP post processor 208 that makes corrections, if applicable, to the text 207 to create corrected utterances 211. For example, the text 207 may include an incorrect word that is plausible in the context and multiple similar sounding words may be equally plausible. The NLP post processor 208 may make corrections by identifying and correcting one or more incorrect words in the text 207 to create corrected utterances 211. After the NLP post processor 208 processes the text 207, the corrected utterances 211 are sent to the encoder 210.

The order context 120, including the interaction history 222, the cart state 224, and the conversation state 226, are provided to the encoder 210 in the form of structured data 209. The structured data 209 includes defined data types that enable the structured data 209 to be easily searched. Unstructured data is raw text, such as "two pizzas with sausage and pepperoni". Structured data may use a structured language, such as JavaScript Object Notation (JSON), Structured Query Language (SQL), or the like to represent the data. For example, "two pizzas with sausage and pepperoni" may be represented using structured data as: {"Quantity": 2, "Item": "Pizza", "Modifiers": ["Pepperoni", "Sausage" ] }. In structured data 209, each data item has an identifier or some fixed structured meaning and is not subject to natural language meaning or interpretation. The order context 120 captures where the customer and the software agent 116 are in the conversation 111 (e.g., what has already been said), what items are in the cart 127, and the like.

The encoder 210 of the NLP pipeline 112 receives the text 207 (in the form of the corrected utterances 211) and the structured data 209 as input and predicts an utterance vector 212. For example, the encoder 210 may use word2vec, a two-layer neural net, to process the text 207 to create the utterance vector 212. The input to the NLP pipeline 112 is a text corpus and the output is a set of vectors, e.g., feature vectors that represent words in that corpus. The encoder 210 thus converts the text 207 into a numerical form that deep neural networks can understand. The encoder 210 looks for transitional probabilities between states, e.g., the likelihood that two states will co-occur. The NLP pipeline 112 groups vectors of similar words together in vector space to identify similarities mathematically. The vectors are distributed numerical representations of features, such as menu items. Given enough data, usage, and contexts during training, the encoder 210 is able to make highly accurate predictions about a word's meaning based on past appearances. The predictions can be used to establish the word's association with other words (e.g., "man" is to "boy" what "woman" is to "girl"), or cluster utterances and classify them by topic. The clusters may form the basis of search, sentiment analysis, and recommendations. The output of the encoder 210 is a vocabulary in which each item has a vector attached to it, which can be fed into a deep-learning net or simply queried to detect relationships between words. For example, by using cosine as a similarity measure, no similarity is expressed as a 90-degree angle, while total similarity is a 0 degree angle, complete overlap.

The encoder 210 may include a pre-trained language model 232 that predicts, based on the most recent utterances 115 and the current order context 120, (1) how the cart 127 is to be modified and (2) what the software agent 116 provides as a response, e.g., dialog response 220 (e.g., one of the responses 113 of FIG. 1). The encoder 210 is a type of machine learning model for NLP that is a model pre-trained directly from a domain specific corpora. In some cases, the encoder 210 may use a Bidirectional Encoder Representations from Transformers (BERT), e.g., a transformer-based machine learning technique for natural language processing (NLP), to predict the utterance vector 212. The encoder 210 may be a language model 232 that converts the text 207 of the utterances into a vector of numbers. The language model 232 may be fine-tuned to a specific domain, e.g., to ordering at a restaurant and that too, at a specific type of restaurant (e.g., pizza, wings, tacos, etc.). The training is based on the conversation data 136 that has been gathered over time between customers and employees who enter data in the POS 102. The employee entered data may be used as labels for the conversation data 136 when training the various machine learning models described herein. The language model 232 associates a specific utterance, e.g., "I want chicken wings", with a specific action, e.g., entering a chicken wing order into the POS 102. The language model 232 predicts what items from the menu 140 are to be added to the cart 127 (e.g., based on one or more actions associated with the utterance 115) and which items are to be removed from the cart 127, quantities, modifiers, or other special treatments (e.g., preparation instructions such as "rare", "medium", "well done" or the like for cooking meat) associated with the items that are to be added and/or removed. In some aspects, the encoder 210 may be implemented as a multi-label classifier. Modifiers may include, for example, half pepperoni, half sausage, double cheese, and the like. In some cases, the language model 232 may be structured hierarchically, e.g., with pizza at a high level and modifiers at a lower level. Alternately, the language model 232 may use a flat system with every possible combination as a unique item.

The utterance vector 212 may be used by three classifiers (e.g., a type of machine learning algorithm, such as a support vector machine or the like), including the dish classifier, the intent classifier 213, and the dialog model 218. For example, the utterance vector 212 may be used by the dish classifier 214 to predict a multiclass cart delta vector 216. The multiclass cart delta vector 216 is used to modify the cart 127. For example, in the cart delta vector 216, the first position may indicate a size of the pizza, e.g., 1=small, 2=medium, 3=large, the second position may indicate a type of sauce, e.g., 0=no sauce, 1=1st type of sauce, 2=2nd type of sauce, the third position may indicate an amount of cheese, e.g., 0=no cheese, 1=normal cheese, 2=extra cheese, 3=double cheese, and the remaining positions may indicate the presence (e.g., 1) or the absence (e.g., 0) of various toppings, e.g., pepperoni, mushrooms, onions, sausage, bacon, olives, green peppers, pineapple, and hot peppers. Thus, (3, 1, 1, 1, 0, 0, 0, 0, 0, 0, 0, 0) is a vector representation of a large pizza with the first type of sauce, a normal amount of cheese, and pepperoni. If the utterances 115 includes "I'd like double cheese", then the vector representation may change to (3, 1, 3, 1, 0, 0, 0, 0, 0, 0, 0, 0), resulting in a corresponding change to the cart 127. Of course, this is merely an example and other vector representations may be created based on the number of options the restaurant offers for pizza size, types of sauces, amount of cheese, toppings, and the like.

The encoder 210 outputs the utterance vector 212 which a dialog model 218 uses to determine a predicted dialog response 220. For example, based on the order context 120 and the most recent utterances 115, the encoder 210 may determine the predicted response 220. The predicted response 220 is a prediction as to what a human employee would say at that point in the conversation (e.g., order context 120) based on the customer's most recent utterances 115. The encoder 210 is trained using the conversation data 136 to predict the dialog response 220 based on the utterances 115 and the order context 120. The software agent 116 converts the predicted dialog response 220 to speech using a text-to-speech converter 228 and provides the verbal response as one of the responses 113 of FIG. 1. The dialog model may use dialog policies 236, candidate responses 238, and the order context 120 to predict the dialog response 220. For example, if a customer states that they would like to order a burger, an appropriate response may be "what toppings would you like on that burger?" In some cases, a natural language generation (NLG) post processor 240 may modify the output of the dialog model 218 to create the dialog response 220. For example, the NLG post processor 240 may modify the dialog response 220 to include local colloquialisms, more informal and less formal dialog, and the like. The NLG response is the translation of the dialog response 220 into natural language.

Figure 5:
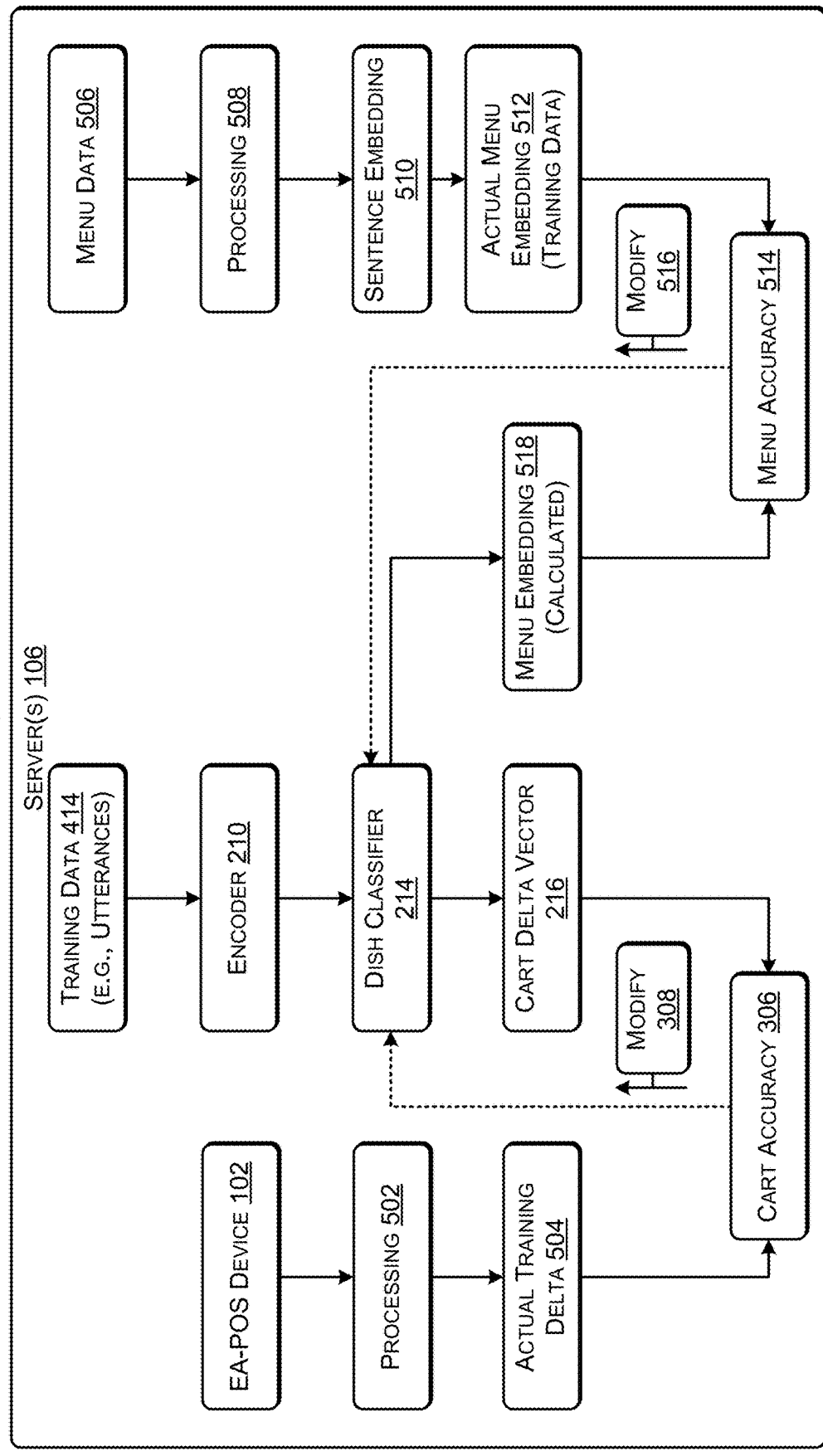
FIG. 5 is a block diagram to create a menu embedding used in a natural language processing (NLP) pipeline, according to some embodiments.

During training of the machine learning model used to create the software agents 116, the human-to-human conversations in the conversation data 136 of FIG. 1 are labelled to fine tune the language model 232, as described in more detail in FIG. 5. The utterances 115 and the order context 120 (e.g., contextual language information and current cart information up to a given point time) are encoded (e.g., into the utterance vector 212) to provide the cart delta vector 216 (e.g., a delta relative to the cart 127) as well as the next predicted dialog response 220. The cart delta vector 216 identifies the steps to update the cart 127. The codified delta over the cart indicates the steps to update the cart 127 and is the label that the human operator creates when handling the conversation that afterwards becomes the training dataset. For example, the encoder 210 is able to associate a specific utterance of the utterances 115, such as "I want chicken wings", with a specific action, e.g., entering a chicken wing order into the cart 127. The encoder 210 predicts what items should be added to the cart 127 (e.g., based on the action associated with the utterance) and which items should be removed from the cart 127, and any associated quantities. In some aspects, the encoder 210 may use a multi-label classifier, such as for example, decision trees, k-nearest neighbors, neural networks, or the like. In a multi-label classifier, modifiers may include, for example, half-pepperoni, half-sausage, double cheese, and the like. In some cases, the order may use hierarchical structures, with each particular type of order, such as pizza, wings, taco, or the like, at a highest level and modifiers at a lower level in the hierarchy. For example, pizza may be at the highest level while half-pepperoni, half-sausage, double cheese, and the like may be at a lower level. In other cases, the order may use a flat system with every possible combination as a unique item. For example, (a) half-pepperoni may be a first item, (b) half-sausage may be a second item, (c) double cheese may be a third item, (d) half-pepperoni and half-sausage may be a fourth item, (e) half-pepperoni, half-sausage, and double cheese may be a fifth item, and so on.

The intent classifier 213 takes the utterance vector 212 as input and creates an intent vector 242 that represents intent(s) 244 of the utterances 115. Thus, the intent classifier 213 creates the intent vector 242 that is a representation of the customer's intent in the utterances 115. The intent vector 242, along with the utterance vector 212, is used by the dialog model 218 to determine the dialog response 220. The dialog model 218 uses the utterance vector 212 and the intents 244 to create the dialog response 220. The dialog model 218 predicts the dialog response 220, the response that the software agent 116 to the utterance 115. In contrast, in a conventional voice-response system, the system uses a finite state machine. For example, in a conventional system, after each utterance, the system may ask for a confirmation "Did you say 'combo meal'? In the system of FIG. 2, a predictive model predicts the dialog response 220 based on the utterance 115 and the order context 120.

The dish classifier 214 predicts which items from the menu 140 the customer is ordering and modifies the cart 127 accordingly. For example, in the utterance "Can I have 2 pizzas with pepperoni, 6 chicken wings, but no salad", the dish classifier 214 determines which parts of this utterance refers to pizza. The dish classifier 214 model understands the history, e.g., there is a salad already in the cart (e.g., because it is included with chicken wings), and predicts the cart delta vector 216 to reflect how many pizzas and how many wings are there in the cart 127. The prediction of the dish classifier 214 indicates what is being added to and what is being deleted from the cart 127. Thus, based on the utterances 115 and the order context 120, the NLP pipeline 112 predicts the cart 127 and the dialog response 220. One or more of the classifiers 213, 214, 218 may use multiclass classification, a type of support vector machine. The intent classifier 213 determines intent(s) 244 of the utterances 115, e.g., is the intent 244 a menu-related question (e.g., "What toppings are on a Supreme pizza?" or a modification ("I'd link a large pepperoni pizza") to the cart 127.

In some aspects, the menu 140 of the restaurant 132 of FIG. 1 may be represented as an ontology 250 (e.g., a set of menu items in the menu 140 that shows each menu item's properties and the relationships between menu items). In some aspects, the ontology 250 may be represented in the form of a vector. e.g., each type of pizza may have a corresponding vector representation. In some aspects, the menu representations may be generated from unlabeled data, to enable the NLP pipeline 112 to handle any type of information related to ordering, dishes, and food items.

The utterances 115 are used as input to the NLP pipeline 112. The utterances 115 may be in the form of a concatenated string of a set of previous utterances. The amount of utterances 115 provided to the NLP pipeline 112 may be based on how much latent knowledge of the conversation state 226 is desired to be maintained. The greater the amount of utterances 115, the better the conversation state 226. The utterances 115 may be a word, a phrase, a sentence, or multiple sentences (including incomplete sentences) that the customer provides to the software agent 116 at each turn in the conversation. For example, an example conversation may include:

<agent>"Welcome to XYZ, how can I help you?"
<customer>"I'd like to order a large pepperoni pizza."
<agent>"Got it. We have a promotion going on right now where you can get an extra large for just two dollars more. Would you be interested in getting an extra large?"

<customer>"Okay, give me an extra large pepperoni."
<agent>"Got it. Would you like anything to drink?"
<customer>"Two bottles of water please."
<agent>"Got it. Anything else I can get for you? Dessert perhaps?"
<customer>"No. That will do it."
<agent>"Did you want this delivered or will you be picking up?"
<customer>"Pickup."
<agent>"Got it. Your total is $20.12. Our address for pickup is 123 Main Street. How would you like to pay?"
<customer>"Here is my credit card information <info>."
<agent? "Thanks. Your order will be ready in 20 minutes at 123 Main Street."

In this conversation, the customer may be initiating the order from home, may be at a drive-through, or may be talking to an automated (e.g., unmanned) kiosk in the restaurant. There are a total of 6 turns in this example conversation, starting with "I'd like to order a large pepperoni pizza", with each turn including the customer's utterances 115 and the agent's response 220. The utterances 115 may thus include multiple sentences. In some aspects, chunking splitting may be performed, resulting in more than one representation corresponding to a unique utterance from the user. In some cases, the audio of the utterances 115 may be used as input, providing complementary features for emotion recognition, estimation of willingness to talk to AI, or for tackling issues as sidebar conversations. The satisfaction estimation based on vocal features also serves as a signal for optimizing the dialog policy.

The interaction history 222 includes contextual language information, such as, for example, the N previous utterances of the customer (N>0), the M previous responses from the software agent 116 (M>0). The cart state 224 includes current cart information. In some cases, a domain specific ontology 250 may be added as semantic representation of items in the knowledge base (e.g., the conversation data 136). The ontology 250 allows the encoder 210 to identify specific entities with which to select the correct modification to operate on the cart 127. The ontology 250 may be used to facilitate the onboarding of new items or whole semantic fields, alleviate the need for annotated data for each label (e.g., the entries of the employee into the POS 102), and improve the performance of the NLP pipeline 112.

The encoder 210 creates the cart delta vector 216 that includes corresponding actions to update the cart 127 based on the most recent (e.g., latest turn) of the utterances 115. The cart delta vector 216 may be a vector, e.g., a sparse array of numbers that corresponds to a state difference. For example, for a cart that includes "Large Pepperoni Pizza", "2 Liter Coke" and "Chicken Salad", if the most recent utterance is "A large coke, but remove the salad", then the encoder 210 may output [0, 1, −1]. In this way, both the quantity and the intent to remove are encompassed.

The encoder 210 determines the utterance vector 212, a numerical representation of each input (e.g., the utterances 115 and the order context 120) based on the language model 232. The utterance vector 212 is a type of encoding, e.g., a set of symbols that represent a particular entity. For example, in some aspects, the encoding may be an array of real numbers, a vector (or a higher dimensional extension, such as a tensor), that is generated by a statistical language model from a large corpus of data. In addition to using the conversation data 136, the encoder 210 may leverage an additional corpus of data on multiple sites 234 (e.g., Wikipedia and the like), such as food-related sites, thereby enabling the encoder 210 to engage in specialized conversations, such as food-related conversations. In some cases, the encoder 210 may be trained to engage in conversations associated with a particular type of restaurant, e.g., a pizza restaurant, a chicken wings restaurant, a Mexican restaurant, an Italian restaurant, an Indian restaurant, a Middle Eastern restaurant, or the like.

The dish classifier 214 may predict the cart delta vector 216 by passing the encoded representations in the utterance vector 212 through additional neural dialog layers for classification, resulting in a sparse vector that indicates the corresponding element(s) within all possible cart actions, e.g., a comprehensive array of labels of possible combinations. The classifiers 213, 214, 218 may be trained using the conversation data 136. The ontology 250 provides information to precise the modifiers, relating cart actions that are highly related such as adding two different variations of the same dish.

The utterances 115 (e.g., representations of the conversation 111 of FIG. 1), along with the order context 120, may be used as the input to the encoder 210 to determine a particular one of the dialog policies 236 to select the next predicted response 220 of the software agent 116. Each particular one of the dialog policies 236 may be used to predict an appropriate response 220 from multiple candidate responses 238. In some cases, the dialog model 218 may use policy optimization with features such as emotion recognition, total conversation duration, or naturalness terms. The dialog response 220 may be fed back to the dialog model 218 as contextual information. In some cases, multitask learning algorithms that combine more than one similar task to achieve better results may be used with the encoder 210 to enable the encoder 210 to learn important aspects of language modeling that serve indirectly to the final downstream task, while allowing a controlled training process via the design of the learning curriculum. The multiple and auxiliary objective functions serve to leverage more error signals during training, and make the model learn proper representations of the elements involved. Semantic and structural information about the menu 140 is encoded into the ontology 250 and used to inform the later layers of the cart prediction system (e.g., dish classifier 214).

In some cases, curriculum learning may be used to design the order with which tasks of different types or complexity are fed to the encoder 210, the dish classifier 214, the intent classifier 213, the dialog model 218, or any combination thereof, to assist tackling different tasks or to perform prolonged training. In addition, to improve extended training processes, the systems and techniques described here may use continual learning, in which the encoder 210, the dish classifier 214, the intent classifier 213, the dialog model 218, or any combination thereof, are retrained as new conversation data is accumulated. In some cases, the continual learning may be performed with elastic weight consolidation to modulate optimization parameters. For example, continual learning along with incremental learning may be used for new classes, e.g., new dishes, sequentially adding them to the objective though training the same model. Curriculum learning is the process of ordering the training data and tasks using logic to increase the improvement on the later, objective tasks. For example, the first training may include auto-regressive loss, then sentence classification, and then a more complex task. In this way, the model may be incrementally improved instead of tackling directly a possibly too complex task. One or more of the machine learning models (e.g., 210, 213, 214, 218) in the NLP pipeline 112 may be re-trained using newly gathered conversation data 136. For example, the retraining may be performed to improve an accuracy of the machine learning models, to train the models for additional products (e.g., a pizza restaurant adds chicken wings) or additional services (e.g., a pandemic causes the introduction of curbside service as a variation of takeout). The retraining may be performed periodically (to improve accuracy) or in response to the introduction of a new product or a new service.

In the flow diagrams of FIGS. 3, 4, 5, and 7 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, and 700 are described with reference to FIGS. 1, 2, and 6 as described herein, although other models, frameworks, systems and environments may be used to implement this process.

Figure 3:
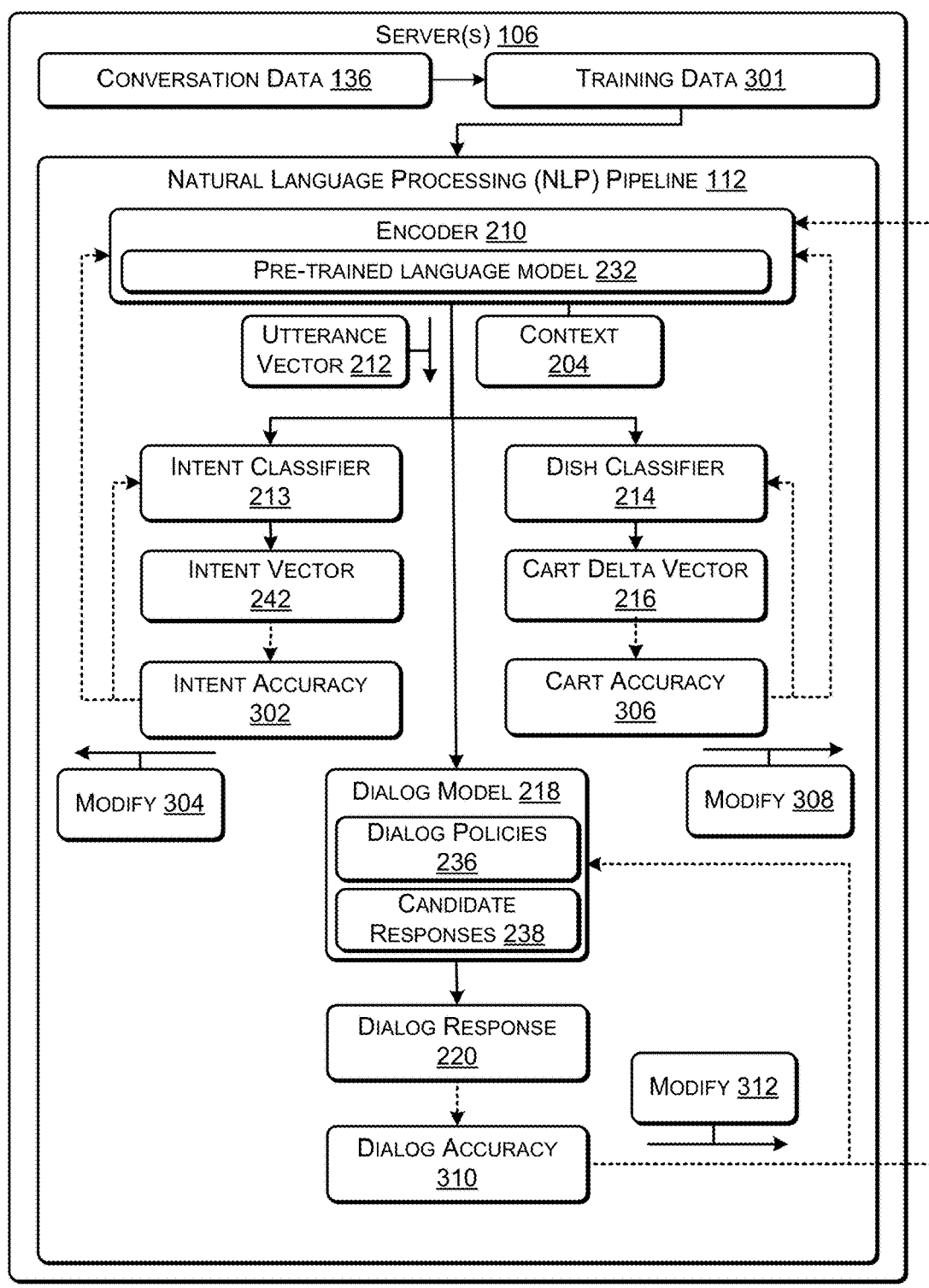
FIG. 3 illustrates a process to train multiple classifiers used in a natural language processing (NLP) pipeline, according to some embodiments.

FIG. 3 illustrates a process 300 to train multiple classifiers used in a natural language processing (NLP) pipeline, according to some embodiments. FIG. 3 illustrates training the encoder 210, the intent classifier 213, the dish classifier 214, and the dialog model 218. A portion of the conversation data 136 may be selected as training data 301 and used as input into the natural language pipeline 112. The encoder 210 may create the utterance vector 212 based on the training data 301.

The intent classifier 213 may create the intent vector 242 based on the utterance vector 212 and the order context 120. The server 106 may determine an intent accuracy 302 of the intent vector 242 by comparing the intent vector 242 with the intent as in the conversation data 136. For example, the intent vector 242 may be compared with the employee's entry into the EA-POS 132 during the conversation included in the training data 301 to determine the intent accuracy 302 of the intent vector 242. If the intent accuracy 302 is less than a desired accuracy (e.g., 90%, 95%, 98% or the like), then an algorithm of the encoder 210 (e.g., to improve the utterance vector 212), of the intent classifier 213, or both may be modified at 304 to improve the intent accuracy 302. The process may be repeated until the intent accuracy 302 satisfies the desired accuracy.

The dish classifier 214 may create the cart delta vector 216 based on the utterance vector 212 and the order context 120. The server 106 may determine a cart accuracy 306 of the cart delta vector 216 by comparing the cart delta vector 242 with the cart associated with the conversation data 136. If the cart accuracy 306 is less than a desired accuracy (e.g., 90%, 95%, 98% or the like), then an algorithm of the encoder 210 (e.g., to improve the utterance vector 212), of the dish classifier 214, or both may be modified at 308 to improve the cart accuracy 306. The process may be repeated until the cart accuracy 306 satisfies the desired accuracy.

The dialog model 218 may predict, using machine learning, the dialog response 220 based on the utterance vector 212 and the order context 120. The server 106 may determine a dialog accuracy 310 of the dialog response 220 by comparing the dialog response 220 with the response of the human employee recorded in the conversation data 136. If the dialog accuracy 310 is less than a desired accuracy (e.g., 90%, 95%, 98% or the like), then an algorithm of the encoder 210 (e.g., to improve the utterance vector 212), of the dialog model 218, or both may be modified at 312 to improve the dialog accuracy 310. The process may be repeated until the dialog accuracy 310 satisfies the desired accuracy.

Figure 4:
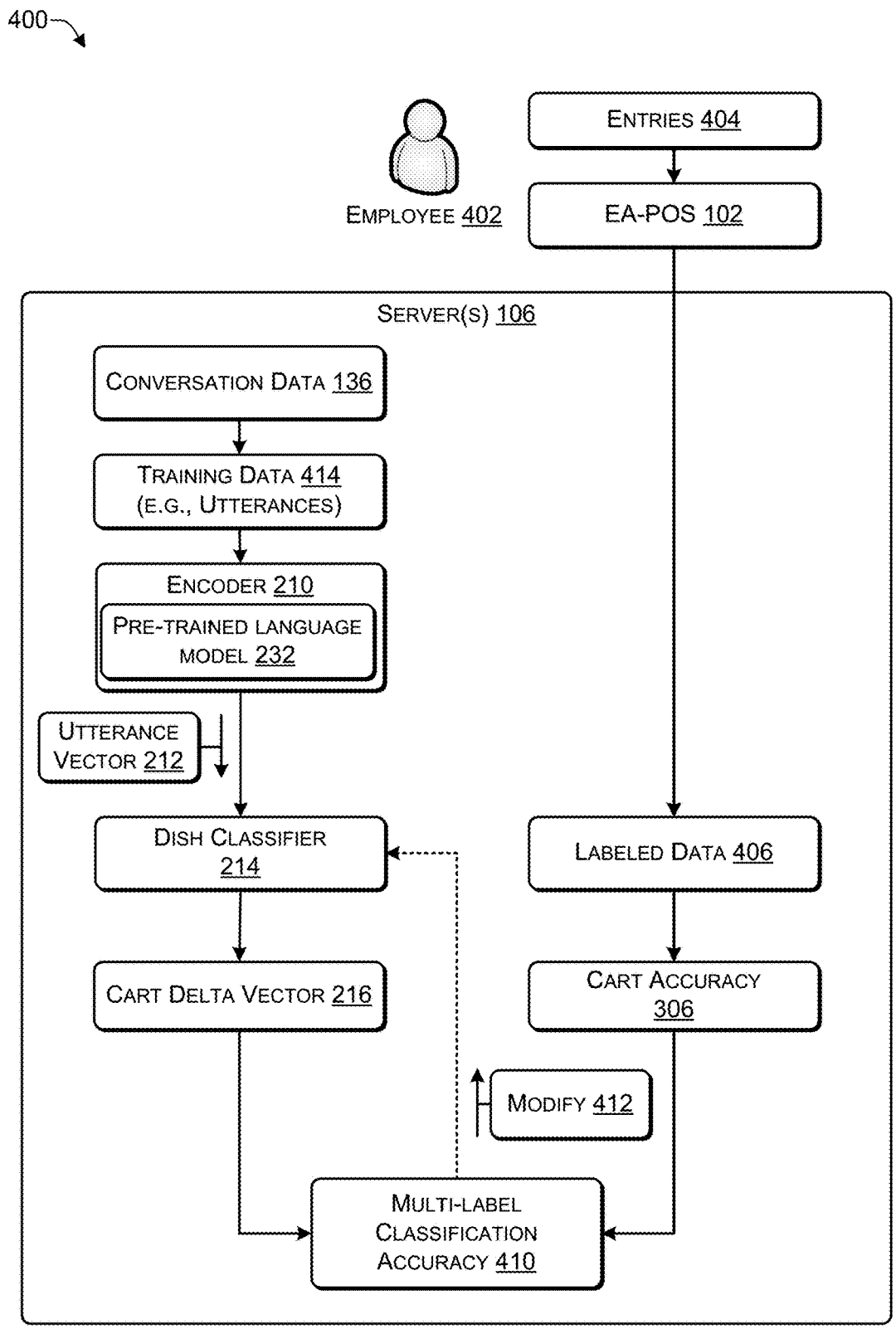
FIG. 4 illustrates a process to train a dish classifier, according to some embodiments.

FIG. 4 illustrates a process 400 to train a dish classifier, according to some embodiments. In FIG. 4, when talking to a customer while taking an order, the employee 402 may make one or more entries 404 into the POS 102. The entries 404 may include the customer's utterances, the employee's responses, what the employee 402 enters into the POS 102, or any combination thereof, with the entries 404 for being used as labels to create labeled data 406. For example, if the user utters "two pepperoni pizzas" and the employee 402 responds by entering two pepperoni pizzas into the POS 102 (e.g., adding the pizzas to the customer's cart) than the utterance and the resulting cart may be labeled based on the entry of two pepperoni pizzas. The server 106 may determine the cart accuracy 306 of the labeled data 406.

A portion of the conversation data 136 may be used to create training data 414 that includes utterances of a customer. The training data 414 may be used as input to the encoder 210 to create the utterance vector 212. The dish vector 214 may create the cart delta vector 216. The cart delta vector 216 and the cart accuracy 306 may be used to determine an accuracy of multi-label classification 410. If the accuracy of the multi-label classification 410 does not satisfy a desired accuracy (e.g., 90%, 95%, 98% or the like), then the dish classifier 214 may be modified 412 to improve an accuracy of the dish classifier 214. This process may be repeated until the multi-label classification accuracy 410 satisfies the desired accuracy.

FIG. 5 is a block diagram 500 to create a menu embedding used in a natural language processing (NLP) pipeline, according to some embodiments. Transactions from the POS device 102 are processed using processing 502 and compared with the cart delta vector 216 produced by the dish classifier 214 to determine an actual training delta 504. The actual training delta 504 is used to determine the cart accuracy 306. If the cart accuracy 306 does not satisfy a desired accuracy (e.g., 90%, 95%, 98% or the like), then the dish classifier 214 may be modified 308 to improve an accuracy of the dish classifier 214. This process may be repeated until the dish classifier 214 satisfies the desired accuracy.

In some cases, menu data 506 (associated with the menu 140) may be processed using processing 508 to determine, for example, sentence embedding 510. The sentence embedding 510 may be used to determine actual menu embedding 512. The actual menu embedding 512 may be compared with the predicted or calculated menu embedding 518 to determine a menu accuracy 514. If the menu accuracy 514 does not satisfy a desired accuracy (e.g., 90%, 95%, 98% or the like), then the dish classifier 214 may be modified 516 to improve an accuracy of the dish classifier 214. This process may be repeated until the dish classifier 214 satisfies the desired accuracy. The text processing may include concatenating a dish name, concatenating a description, concatenating ingredients, concatenating tags and the like. An example embedding includes an array of numbers and the encoding process may include matrix multiplication.

Figure 6:
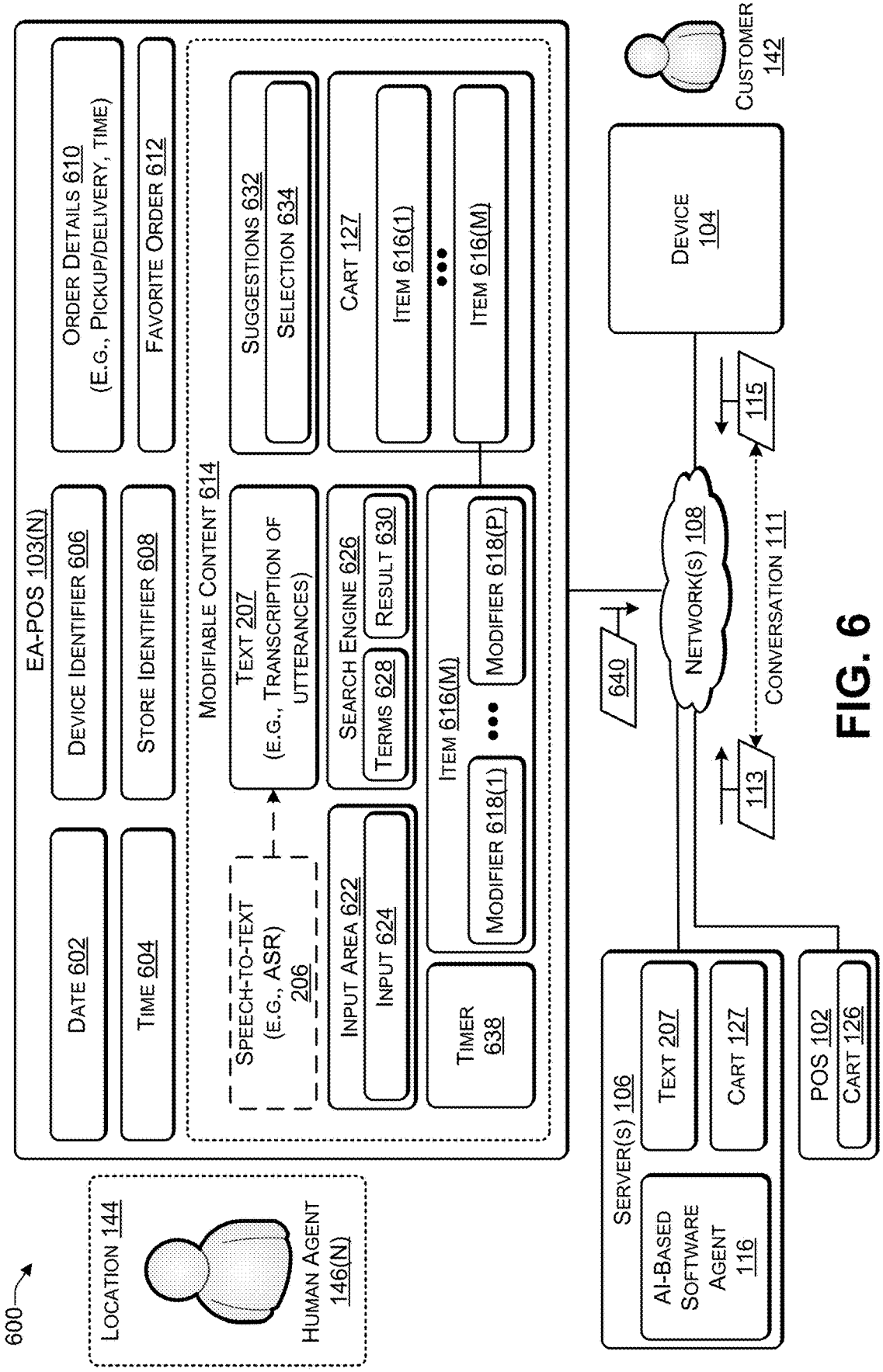
FIG. 6 is a block diagram illustrating enabling an agent to edit modifiable content using an employee assist (EA) point-of-sale (POS), according to some embodiments.

FIG. 6 is a block diagram illustrating a system 600 to enable an agent to edit modifiable content using an employee assist (EA) point-of-sale (POS), according to some embodiments. The EA-POS 103(N) is associated with the human agent 146(N) that is located at the location 144. The location 144 may be in a different city, county, state, or country relative to the location of the restaurant where the order will be created (e.g., for pickup by the customer or delivery to the customer). The POS 102 may be used by the AI-based software agent 116 to take the order associated with the customer 142. The EA-POS 103(N) may mirror what is being displayed in the cart 126 to enable the human agent 146(N) to view, substantially in real-time, the contents of the cart 127 and the conversation 111 (e.g., including the text 207) between the AI-based software agent 116 and the customer 142.

The EA-POS 103(N) may display multiple fields, such as, for example, a current date 602 and a current time 604 (and/or a time when the conversation 111 was initiated). If the customer 142 is phoning in an order, then the device 104 may be a smart phone, a tablet, or the like and the EA-POS 103(N) may display a phone number associated with the device 104 as a device identifier 606. If the customer 142 is using a kiosk, such as a drive-through kiosk, then the device identifier 606 may identify the kiosk (e.g., parking lot kiosk #2, drive-through lane kiosk #1) that the customer 142 is using. The EA-POS 103(N) may display a store identifier 608, such as a store number, a store address, or other type of identifier that identifies a physical location of the restaurant 132 of FIG. 1. The EA-POS 103(N) may display order details 610, such as whether the order is for pickup or for delivery, a pickup time or a delivery time, a gate code for a gated community, and other order-related details and a favorite order 612 identifying an order that the customer 142 frequently places (e.g., more than a predetermined percentage of the orders).

The EA-POS 103(N) may display modifiable content 614 that the human agent 146(N) is able to modify. The modifiable content 614 may include the text 207 that is derived from a transcription of one of the utterances 115. For example, the text 207 may be created using the speech-to-text 206 of FIG. 2. The modifiable content 614 may include the cart 127. The cart 127 may include zero or more items 616(1) to 616(M) (M>=0) and each item, such as the item 616(M), may include one or more modifiers 618(1) to 618(P) (where P>0). For example, the modifiers 618 may include a quantity, a size (e.g., small, medium, large, extra-large), toppings (e.g., pepperoni, mushrooms, and the like), condiments (e.g., mustard, ketchup, mayo, pickle for a burger), and other modifications (e.g., customizations) to the item 616(M). The EA-POS 103(N) enables the human agent 146(N) to edit the text 207 or the cart 127 based on viewing the text 207 and, in some cases, lessening into the conversation 111.

The modifiable content 614 may include an input area 622 into which the human agent 146(N) provides input 624 which the AI-based software agent 116 then verbalizes as one of the responses 113. The input 624 is text input that the human agent 146 may enter using a keyboard. In some cases, the human agent 146 may speak something and the speech to text 206 may convert the human agent's speech to text that is provided as the input 624. For example, the human agent 146(N) may enter into the input area 622 a question ("did you say 'large?'"), request a clarification ("did you want to order two pizzas?"), provide what the human agent 146(N) thinks the customer 142 intended to say ("did you mean a hand-tossed crust?"), or the like.

The EA-POS 103(N) may provide a search engine 626 to enable the human agent 146(N) to perform a search, such as a search of the cart 127 or a search of the menu 140 of FIG. 1. For example, the human agent 146(N) may enter one or more search terms 628, the search engine 626 may perform a search, and provide a result 630 of the search. For example, if the human agent 146(N) is unfamiliar with a particular menu item, then the human agent 146(N) may use the search engine 626 to perform a search of the search terms 628 and, after viewing the result 630 of the search, modify the text 207 or the cart 127.

The human agent 146(N) views the text 207 and, if the human agent 146(N) determines that the text 207 is incorrect, the human agent 146(N) may directly modify the text 207 (to create modified text) and instruct (e.g., via one or more key presses or the like) the AI-based software agent 116 to provide a response (of the responses 113) to the modified text. If the EA-POS 103 is a touchscreen-based device, the human agent 146(N) may instruct the AI-based software agent 116 to provide the response to the modified text by selecting a particular key on the touchscreen. Alternately or in addition to, the human agent 146(N) may press a particular set of keys that instructs the AI-based software agent 116 to provide the response to the modified text.

The EA-POS 103(N) may provide suggestions 632 from which the human agent 146(N) can make a selection 634. For example, the human agent 146(N) may select one or more words in the text 207 and press one or more keys (e.g., <control>+"S") that cause the EA-POS 103(N) to provide one or more of the suggestions 632. To illustrate, the human agent 146(N) may select the word "crust" and press the one or more keys, causing the EA-POS 103(N) to display the suggestions 632 that include all available crusts that can be ordered, such as thin crust, thick crust, pan crust, hand-tossed crust, stuffed crust, or the like. The human agent 146(N) may make the selection 634 from the suggestions 632. For example, the text 207 may include "pan tossed crust" and the human agent 146(N) may make the selection 634 of "hand-tossed crust" to correct the text 207. Modifying the text 207 may cause the contents of the cart 127 to be automatically (without human interaction) modified. Instead of or in addition to modifying the text 207, the human agent 146(N) may modify the contents of the cart 127. In some cases, the human agent 146(N) may modify the text 207 and modify the cart 127 as this may be the most expeditious way of making the changes.

Thus, when the customer 142 calls the restaurant 132 (of FIG. 1) to place an order, the AI-based software agent 116 in the conversational order taking system 600 ("system") initiates the conversation 111 with the customer 142 in which the customer makes a series of utterances 115 and the software agent 116 provides responses 113 to the utterances 115. As each customer utterance is received, the utterance is converted to the text 207 (as described herein). If the software agent 116 determines that the customer utterance includes a menu item from the menu 140 (of FIG. 1) that the customer 142 desires to order, the software agent 116 adds the item to the customer's cart 127.

In some cases, the software agent 116 may encounter a situation that does not allow the software agent 116 to complete the customer's order. For example, the software agent 116 may ask the customer 142 to provide particular information but may not understand the customer's utterances 115. To illustrate, for a pizza, the particular information may be a modifier to the pizza, such as a size (e.g., small, medium, large, or extra-large) of the pizza, the type of crust (e.g., thick crust, thin crust, pan crust, stuffed crust, or the like), the type of sauce (e.g., marinara sauce, arrabbiata sauce, white sauce, or the like), the toppings, and other types of modifiers. Rather than repeatedly asking the customer 142 to provide the particular information, after the software agent 116 is unable to determine the particular information after a predetermined number of attempts (e.g., X>0), the software agent 116 initiates a connection to an EA-POS 103(N) that is being viewed by the human agent 146(N). The connection (e.g., via the network 108) between the AI-based software agent 116 (hosted by the server 106) and the EA-POS 103(N) enables the EA-POS 103(N) to view the cart 127, the text 207, a dialog history, and the like. For example, the information provided to the AI-based software agent 116 is also displayed, substantially simultaneously, on the EA-POS 103(N). The human agent 146(N) is able to view and modify, via the EA-POS 103(N), the text 207 (transcription) of the customer's utterances 115, the contents of the cart 127, and make modifications to the modifiable content 614.

The human agent 146(N) is able to work in the background to modify the modifiable content 614, such as the text 207, the contents of the cart 127, and the like, while enabling the software agent 116 to continue to engage in the conversation 111 with the customer 142 without the customer 142 being aware that the human agent 146(N) is present. In this way, the human agent 146(N) is able to make modifications to the correct errors in the text 207 (transcription) of the customer's utterances 115. In addition, when the software agent 116 modifies the contents of the cart 127 in response to the customer's utterances 115, the human agent 146(N) is able to correct the contents of the cart 127. The human agent 146(N) is thus able to make changes to the modifiable content 614, such as the text 207 of the utterances 115 and the cart 127 without the customer 142 being aware that the human agent 146(N) is listening in to the conversation 111 between the software agent 116 and the customer 142. In most cases, the human agent 146(N) does not directly engage in a conversation with the customer 142.

Data 640 that is associated with each order, including the customer's utterances 115 (e.g., audio), the text 207 (e.g., created based on a transcription of the customer's utterances), the software agent's modifications to the cart 127, and the modifications made by the human agent 146(N) to the text 207 and/or to the cart 127 are sent to the server 106 and may be used at a later date as training data to retrain one or more machine learning algorithms. In this way, the automatic speech recognition (ASR) algorithm that converts speech (e.g., the customer's utterances) to text and the software agent's modifications to the contents of the cart based on the text may be continually improved by the retraining to improve the accuracy of (i) the ASR algorithm and (ii) the AI-based software agent 116.

The system 600 enables human agents 146 to listen to the customer's utterances 115, view the text 207 derived from the utterances 115, and view the associated cart 127. Based on this information, the human agents 146 are able to make live (e.g., real-time) corrections to the text 207, the cart 127, or both.

In a first scenario, the human agent 146(N) may correct the text 207 (e.g., transcribed by the ASR) while the AI-based software agent 116 continues to engage in the conversation 111 with the customer 142. When the human agent 146(N) selects a word or a phrase in the text 207, the EA-POS 103(N) may provide suggestions 632 and receive the selection 634 of one of the suggestions 632. For example, if the text 207 includes "pan-tossed crust" and the human agent 146(N) selects "pan-tossed crust" in the text 207, the EA-POS 103(N) may automatically (without human interaction) provide one or more suggestions 632 of modifiers (e.g., stuffed, thin, thick, pan, or hand tossed) to "crust" and the human agent 146(N) may provide the selection 634, e.g., "hand tossed" to correct the transcription "pan tossed".

In a second scenario, the human agent 146(N) may update the cart 127 to include "hand tossed crust" instead of whatever crust the software agent 116 had selected (and added to the cart 127) while the AI-based software agent 116 continues to engage in the conversation 111 with the customer 142. Of course, in some cases, the human agent 146(N) may perform modifications to the text 207 and to the cart 127. In either or both of the first scenario and the second scenario, the AI-based software agent 116 generates a follow-up response 113 to the customer 142 to continue the conversation 111. Thus, the human agent 146(N) typically does not engage in a direct conversation with the customer 142 because there is usually no hand-off of the customer 142 from the AI-based software agent 116 to the human agent 146(N). The AI-based software agent 116 remains in the conversation 111 with the customer 142. During the entire conversation 111 with the software agent 116, the customer 142 may be unaware that the human agent 146(N) is making corrections to modifiable content 614, such as the text 207 and/or cart 127. If a particular circumstance arises where the software agent 116 is unable to continue engaging with the customer (e.g., a software issue is encountered, communication with the software agent 116 is lost, or the like), the human agent 146(N) has the option to take over the conversation 111 from the software agent 116 and engage directly with the customer 142 to complete the order.

The human agent 146(N) makes corrections to the modifiable content 614 (e.g., text 207, cart 127, and the like) while the AI-based software agent 116 remains in the conversation 111 with the customer 142. The human agent 146(N) may monitor (e.g., listen in on) at least a portion of the conversation 111 between the AI-based software agent 116 and the customer 146. The human agents 146 may be in a pool and may be connected to a conversation between a software agent and a customer when the software agent 116 encounters particular situations in which the software agent 116 is unable to proceed further in the conversation 111. Thus, the software agent 116 determines when to escalate and involve one of the human agents 146. After the software agent 116 escalates, the EA-POS 103(N) of the human agent 146(N) is connected to the server 106 to enable the human agent 146(N) to view the text 207 associated with one or more customer utterances 115 and the current contents of the cart 127. The EA-POS 103(N) may display the text 207 of a most recent utterance and enable the human agent 146(N) to view the text of at least Q (Q>0) previous utterances 115. The human agent 146(N) may perform corrections to the text 207, the cart 127, or both (e.g., using input devices, such as a keyboard and mouse, and without directly engaging in conversation with the customer 142). The human agent 146(N) may non-verbally instruct the AI-based software agent 116 to resume the conversation 111 and complete taking the customer's order. The human agent 146(N) may continue to monitor the conversation until the AI-based software agent completes taking the customer's order. The human agent 146(N) has the option (e.g., when a situation arises where the software agent 116 is unable to complete the conversation 111 with the customer 142) to take over the conversation 111 from the software agent 116 and converse directly with the customer 142 to complete the order.

If the customer's utterances 115 do not include sufficient details associated with an item being ordered, e.g., the customer orders a pizza but does not provide modifiers, such as a size of the pizza, a type of crust, types of toppings, and the like, then the human agent 146(N) may correct the text 207 and the software agent 116 may be trained to display, to the human agent 146(N), one or more suggestions 632 based on the corrected text. The human agent 146(N) may review and provide a particular selection 634 from the suggestions 632 and the software agent 116 may provide the particular selection to the customer 142 and resume the conversation 111 with the customer 142. If the human agent 146(N) reviews the suggestions 632 but does not select any of the suggestions 632, the human agent 146(N) may provide a response as input 624 in the input area 622 and instruct the software agent 116 to verbalize the input 624 as one of the responses 113 to the customer 142 and resume the conversation 111 with the customer 142.

If the customer's utterances 115 include a word or a phrase that the AI-based software agent 116 has not been trained to answer, then the software agent 116 may escalate by connecting to the EA-POS 103(N) of the human agent 146(N). The human agent 146(N) may view the text 207 and type the input 624 in the input area 622. The software agent 116 may verbalize the input 624 as one of the responses 113 and resume the conversation 111 with the customer 142. In some cases, the software agent 116 may provide a catchall phrase (e.g., "I am not quite sure what you mean—could you please explain?") to the customer 142 while the escalation is taking place to provide time for the connection between the server 106 and the EA-POS 103(N) to be established and to provide time for the human agent 146(N) to review the text 207 of the customer's utterances and determine how to proceed.

The EA-POS 103(N) may enable the human agent 146(N) to make the selection 634 from a predetermined set of one or more suggestions 632 and modify the text of the selection 634 before instructing the software agent 116 to verbalize the modified response and resume the conversation 111 with the customer 142. The human agent 146(N) has the option (e.g., when a situation arises where the software agent 116 is unable to complete the conversation 111 with the customer 142) to take over the conversation 111 from the software agent 116 and converse directly with the customer 142 to complete the order. For example, if the software agent 116 encounters a software problem, the server 106 encounters a hardware problem, or the like, then the human agent 146(N) may take over the conversation 111 from the software agent 116.

The EA-POS 103(N) provides the capability to perform a search for any item on the menu (or in the cart) using the search engine 626 and add an item from the search result 630 to the cart 127. For example, if the human agent 146(N) is unable to precisely remember the name of a particular menu item, the human agent 146(N) may use the search engine 626 to perform a search and then select from the search result 630 to add the particular menu item to the cart 127. As another example, the human agent 146(N) may search for a menu item (e.g., one of the items 616) that has been added to the cart 127 to determine the available options for the menu item. The EA-POS 103(N) may display a timer 638 to enable the human agent 146(N) to determine an amount of time that has elapsed or that the human agent 146(N) is nearing an end to an available amount of time allocated to edit the text 207, edit the cart 127, or provide the input 624 for the AI-based software agent 116 to verbalize in the conversation 111. In some cases, e.g., if the human agent 146(N) is unable to edit the text 207, edit the cart 127, or provide the input 624 in the allocated (e.g., predetermined) amount of time, then the conversation 111 may be automatically (without human interaction) handed over from the software agent 116 to the human agent 146(N).

The AI-based software agent 116 may be trained to intelligently add filler phrases in the conversation while the human agent 146(N) is making corrections. For example, the AI-based software agent 116 may monitor the human agent's EA-POS 103(N), determine that the human agent 146(N) is modifying the text 207, modifying one of the items 616 in the cart 127, or typing input 624 in the input area 622, and provide a filler (e.g., "We have a special this month on cinnamon sticks", "Would you like to order a desert?" or the like) to provide the human agent 146(N) with additional time to complete the task that the human agent 146(N) is performing.

If the text 207 is relatively long and/or unintelligible, in some cases, the human agent 146(N) may make the selection 634 of the suggestions 632, such as, for example, asking the customer 142 to repeat the order, one item at a time. In other cases, the human agent 146(N) may select a portion of the text 207 and instruct the AI-based software agent 116 to respond to the selected portion (e.g., and ignore a remaining portion of the text 207). In still other cases, the human agent 146(N) may modify the cart 127 based on the portion of the text 207 that is comprehensible and instruct the AI-based software agent 116 to ask the customer 142 regarding any remaining customizations/modifications to the items 616 in the cart 127.

If the customer 142 "barges in" to the conversation 111 and begins talking while the AI-based software agent 116 is processing a previous utterance, the software agent 116 may miss an item or an item modifier. If the software agent 116 misses an item (e.g., pizza) or an item modifier (e.g., size, type of crust, toppings or the like for a pizza) that is included in the utterance 115 (audio) but may or may not be included in the text 207, the human agent 146(N) may modify the cart 127 or edit the text 207 accordingly.

In some cases, after the AI-based software agent 116 has escalated to involve the EA-POS 103(N) of the human agent 146(N), and the human agent 146(N) desires to clarify something before allowing the AI-based software agent 116 to resume the conversation 111, the human agent 146(N) may ask for at least one turn in the conversation in which the human agent 146(N) types text input 624 into the text input area 622 that is verbalized by the AI-based software agent 116 to the customer 142. In some cases, the NLP pipeline 112 of FIG. 2 may auto-correct the text 207 such that the conversion of the input 624 to speech sounds correct. For example, the NLP pipeline 112 may auto-correct a term or phrase to a vernacular phrase or a phrase commonly used in a particular geographic location that the restaurant is located. For example, "tea" may be auto-corrected to "hot tea" in Northern states and Canada and auto-corrected to "iced tea" in states such as North Carolina and Georgia.

The data 640 that is captured (e.g., for retraining the artificial intelligence) may include, for example, the raw audio of the customer's utterance 115, the text 207 (e.g., transcript created by ASR), and the modified text as edited by the human agent 146(N), and, in some cases, a timestamp. The data 640 that is captured may include the cart 127 created by the AI-based software agent 116 in response to the text 207 and the modified cart 127 created by the human agent 146(N) by modifying the cart. A corpus of word corrections may include words corrected by the human agent 146(N), e.g., the original word transcription along with the edits made by the human agent 146(N). The ASR transcription may include out-of-dictionary (OOD) words and words typed by the human agent 146(N) in response to the OOD words. The system 600 may keep track of latency, e.g., how long it takes from the time the AI-based software agent 116 determines to escalate to the EA-POS 103(N) associated with the human agent 146(N), including the time taken by the human agent 146(N) to (i) edit the text 207, (ii) modify the cart 127, or (iii) type the input 624 in the text input area 622 for the AI-based software agent 116 to verbalize, until the time the software agent 116 resumes the conversation 111 with the customer 142. The system 600 may keep track of the frequency at which a human agent 146(N) takes over from the AI-based software agent 116 rather than allowing the software agent 116 to complete the conversation 111 with the customer 142.

Each of the conversations 111 has multiple turns between the AI-based software agent 116 and the customer 142. When the AI-based software agent 116 provides one of the responses 113, such as asking a question and doesn't get a satisfactory response (e.g., after X tries, X>0), then the AI-based software agent 116 escalates and connects to the EA-POS 103(N) of the human agent 146(N). If the customer 142 doesn't understand the question being asked, the human agent 146(N) answers the question on behalf of the customer 142 and the AI-based software agent 116 continues the conversation 111 with the customer 142. The human agent 146(N) may have the option to stay until the order is complete or leave the conversation 111 and go to another conversation.

The advantage of the system 600 is that, in most cases, the AI-based software agent 116 never hands over the conversation 111 to the human agent 146(N). Instead, the human agent 146(N) is in the background, performing edits to the transcription and/or cart to correct any errors. Less human involvement means higher profit margins for the restaurant. In addition, customers become more accustomed to interacting with the AI-based software agent (otherwise, customers might keep asking for the conversation to be transferred to a human agent). Further, the human agents may be located in a different city, county, state, or country and may be non-native English speaking and/or have an accent. Because the human agents are making corrections to the text of the transcription or the cart in the background, the human agents spoken English is not a factor. Thus, the pool of human agents can be located in a location with relatively low labor costs (e.g., relative to the location of the restaurant) to further reduce costs.

Figure 7:
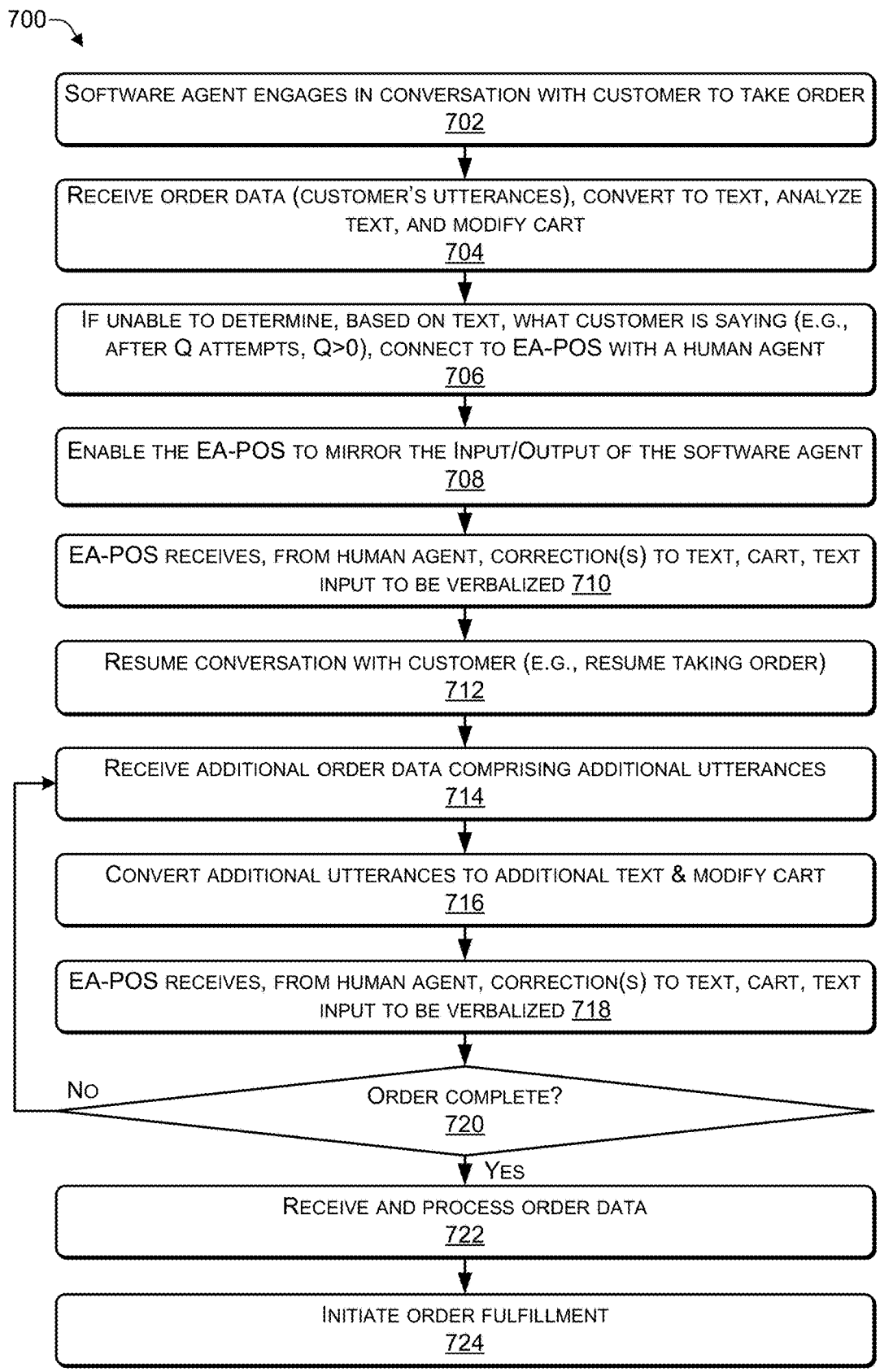
FIG. 7 is a flowchart of a process that includes an artificial intelligence (AI) based software agent engaging in a conversation with a customer to take an order, according to some embodiments.

FIG. 7 is a flowchart of a process 700 that includes an artificial intelligence (AI) based software agent engaging in a conversation with a customer to take an order, according to some embodiments. The process 700 may be performed by one of the AI-based software agents 116 of FIGS. 1, 2 and 6.

At 702, the AI-based software agent engages in a conversation with a customer to take an order. At 704, the AI-based software agent receives order data comprising the customer's utterances, converts the utterances to text, and modifies a cart based on the text. For example, in FIG. 6, the AI-based software agent 116 receives the utterances 115 from the customer 142, converts the utterances 115 to the text 207, displays the text 207. The AI-based software agent 116 performs an analysis of the text to determine whether the AI-based software agent can respond to the text, e.g., determine whether the machine learning algorithm used for the AI-based software agent is trained to respond to the text 207.

At 706, if the AI-based software agent is unable to determine, based on the text, what the customer is saying (after X attempts, X>0), then the AI-based software agent may initiate a connection between the server (hosting the AI-based software agent) and an EA-POS associated with a human agent. At 708, the AI-based software agent may enable the EA-POS to mirror the input/output (I/O) of the software agent, e.g., the text of the utterance, the cart contents, and the like is displayed on the EA-POS of the human agent. At 710, the EA-POS receives, from the human agent, corrections to the text, corrections to the cart, text input to be verbalized, or any combination thereof. At 712, the AI-based software agent resumes the conversation with the customer (e.g., resumes taking the order). For example, in FIG. 6, if the AI-based software agent 116 is unable to determine the customer intent (e.g., unable to determine if the customer is asking a menu-related question, ordering a menu item, or the like) based on the text 207 (e.g., corresponding to one of the utterances 115), after a predetermined number of attempts (X attempts where X>0), then the AI-based software agent 116 may initiate a connection between the server 106 and the EA-POS 103(N) that is associated with the human agent 146(N). The server 106 and the EA-POS 103(N) are configured such that the human agent 146(N) is able to view and modify the text 207, the contents of the cart 127, and other modifiable content. For example, after the customer utterances 115 are converted to the text 207 and the AI-based software agent 116 modifies the cart 127 based on the text 207, the human agent 146(N) is able to (i) modify the text 207, (ii) modify the cart 127, (iii) enter text input 624 into the input area 622 which the AI-based software agent 116 verbalizes as one of the responses 113 to the customer 142 or any combination of (i), (ii), and (iii). If the human agent 146(N) modifies the text 207, then the AI-based software agent 116 may modify the cart 127 based on the modified text 207. If the human agent 146(N) modifies the cart 127, then the AI-based software agent 116 may resume the conversation 111 based on the modified cart 127. If the human agent 146(N) enters text input 624 into the input area 622, then the AI-based software agent 116 verbalizes the text input 624 and receives an utterance from the customer 142 which is then converted to text 207. The AI-based software agent 116 may modify the cart 127 based on the text 207. After the human agent 146(N) (i) modifies the text 207, (ii) modifies the cart 127, (iii) enters the text input 624, or any combination thereof, the AI-based software agent 116 resumes the conversation 111 with the customer 142. In some cases, the human agent 146(N) may perform any combination of (i), (ii), and (iii) and then instruct the AI-based software agent 116 to resume the conversation 111. The instruction to the AI-based software agent 116 may be based on selecting a particular set of one or more keys on the EA-POS 103(N) or performing a particular set of key presses (e.g., "<control-key>+R-key" for resume).

At 714, the AI-based software agent receives additional order data comprising additional utterances. At 716, the AI-based software agent converts the additional utterances to additional text and modifies the cart based on the additional text. At 718, the second EA-POS receives, from the human agent, corrections to the text, corrections to the cart, text input that is to be verbalized, or any combination thereof. At 720, if the AI-based software agent determines whether the order is complete. If the AI-based software agent determines, at 720, that "no" the order is not complete, then the AI-based software agent may proceed to 714 to receive additional order data comprising additional utterances. In this way, 714, 716, and 718 may be repeated until the AI-based software agent determines that the order is complete. If the AI-based software agent determines, at 720, that "yes" the order is complete, then the process proceeds to 722 where the AI-based software agent receives and processes the order data and, at 724, initiates order fulfillment. For example, in FIG. 6, the AI-based software agent 116 receives the additional order data in the form of the utterances 115, converts the utterances 115 to the text 207, and modifies the cart 127 based on the text 207. The human agent 146(N) may hear the utterance 115 and view the text 207. In some cases, the human agent 146(N) may modify the text 207, modify the cart 127, provide the input 624 into the input area 622, or any combination thereof. This process may repeat until the AI-based software agent 116 determines that the order is complete. For example, the AI-based software agent 116 may ask the customer 142 whether the customer 142 has completed providing the order or if the customer 142 needs anything else. If the customer 142 indicates that the order is complete, then the AI-based software agent 116 may receive and process the order data and initiate order fulfillment of the items 616 in the cart 127.

Thus, if an AI-based software agent is, after a predetermined number of attempts, unable to complete taking an order from a customer, the AI-based software agent may automatically connect to an EA-POS to which a human agent has access. Once the connection between the AI-based software agent and the EA-POS is established, the modifications made by the human agent to the EA-POS (e.g., a text transcription, a cart, or an input area) are provided to the AI-based software agent. While the AI-based software agent is engaged in a conversation with the customer, the human agent works in the background by correcting the text of the transcription, modifying the cart, providing input for the AI-based software agent to verbalize, or any combination thereof. The human agent typically does not take over the conversation from the AI-based software agent and therefore does not communicate directly with the customer. The customer may be unaware that a human agent is monitoring the conversation between the customer and the AI-based software agent and making corrections (e.g., to the text transcript or cart) or causing the AI-based software agent to verbalize particular text. The human agent may take over the conversation from the AI-based software agent under particular circumstances, in which the AI-based software agent is unable to continue conversing with the customer, such as when the AI-based software agent encounters a software error, the server hosting the AI-based software agent encounters a software error or a hardware error, or another type of error that does not allow the AI-based software agent to complete the conversation. Because the AI-based software agent is able to handle most conversations with the customer without involving a human agent, labor costs for the restaurant are reduced, increasing profitability. In addition, in a tight labor market, the restaurant is able to let the software agents take orders while operating the restaurant using fewer employees. The human agent may be located at a location that is different from the restaurant and that has lower labor costs (relative to the restaurant) to reduce the costs associated with having human agents available. The data gathered from the human agent's changes to the text transcription may be used to improve the accuracy of the speech-to-text algorithm (e.g., automatic speech recognition (ASR)). The data gathered from the human agent's changes to the cart may be used to improve the ASR, to retrain the AI-based software agent to improve how the AI-based software agent modifies the cart based on the text transcription of the utterances, or both. The input provided by the human agent and verbalized by the AI-based software agent may be used to retrain the software agent and increase the vocabulary and phrase book of the AI-based software agent. In this way, the various algorithms, including machine learning algorithms, can be improved over time to more closely mimic a human agent and reduce how often the software agent escalates (e.g., connects the first EA-POS to the second EA-POS of a human agent) a conversation.

Figure 8:
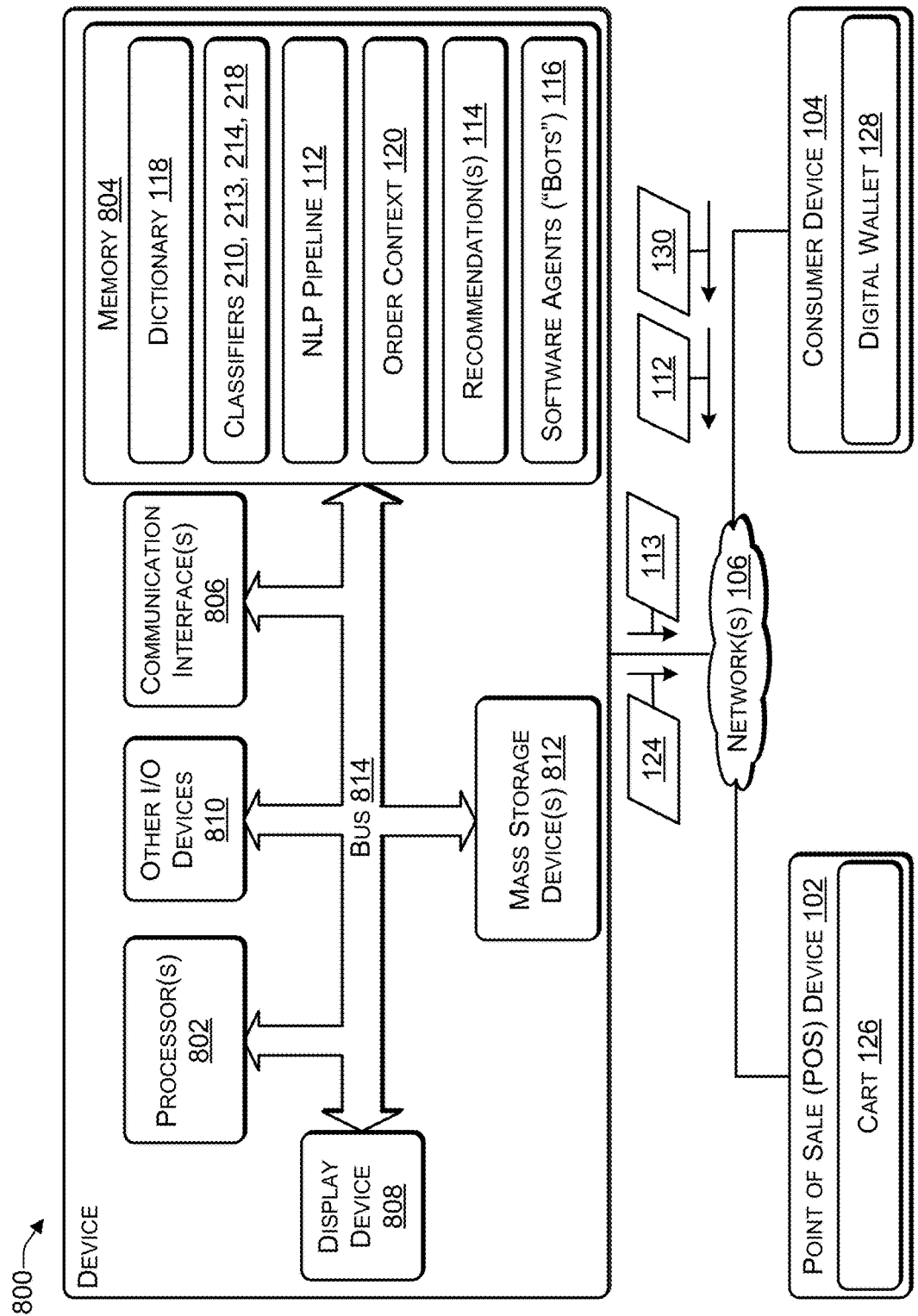
FIG. 8 illustrates an example configuration of a computing device that can be used to implement the systems and techniques described herein.

FIG. 8 illustrates an example configuration of a device 800 that can be used to implement the systems and techniques described herein, such as, for example, the device 104, the POS 102, the EA-POS 103, and/or the server 106 of FIG. 1. For illustration purposes, the device 800 is illustrated in FIG. 8 as implementing the server 106 of FIG. 1.

The device 800 may include one or more processors 802 (e.g., CPU, GPU, or the like), a memory 804, communication interfaces 806, a display device 808, other input/output (I/O) devices 810 (e.g., keyboard, trackball, and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include a graphics processing unit (GPU) that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein and may be any type of non-transitory media capable of storing computer-readable, processor-executable program instructions as computer program code that can be executed by the processors 802 as a particular machine configured for carrying out the operations and functions described in the implementations herein.

The device 800 may include one or more communication interfaces 806 for exchanging data via the network 108. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 804 and mass storage devices 812, may be used to store software and data, including, for example, the dictionary 118, the classifiers 210, 213, 214, 218, the NLP pipeline 112, the order context 120, the recommendations 114, and the software agents 116.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   training a software agent comprising a machine learning algorithm using conversation data that includes hundreds of thousands of conversations;
   after training the software agent, deploying the software agent on a server;
   receiving, by the software agent, an utterance from a customer, the software agent trained to engage in a conversation with the customer to take an order;
   creating, via the software agent, a cart associated with the order;
   converting, via the software agent, the utterance to text;
   providing, to an encoder of a natural language processing pipeline, as structured data:
   an order context including an interaction history between the software agent and the customer; and
   a conversation state;
   predicting, by the encoder, based on the text and the structured data, an utterance vector;
   determining, based at least in part on the utterance vector, that the software agent is untrained to respond to the text;
   establishing a connection between:
   the server hosting the software agent; and
   a point-of-sale device that is associated with a human agent;
   receiving, from the human agent, a modification to order data displayed by the point-of-sale device;
   resuming, by the software agent and based at least in part on the modification to the order data, the conversation with the customer, wherein the human agent does not directly interact with the customer during the conversation between the software agent and the customer; and
   after determining, by the software agent, that the customer has completed the order, retraining the software agent based at least in part on:
   the conversation between the software agent and the customer;
   the text;
   a content of the cart; and the modification made by the human agent,
   the retraining causing an improvement in an accuracy of the software agent in order taking.

2. The method of claim 1, further comprising: providing, to the software agent, the modification to the order data.

3. The method of claim 1, wherein resuming, by the software agent and based at least in part on the modification to the order data, the conversation with the customer comprises: verbally providing, by the software agent, a response to the customer based at least in part on the modification to the order data.

4. The method of claim 1, wherein receiving, from the human agent, the modification to the order data comprises:
   receiving one or more edits, provided by the human agent, to the text;
   receiving one or more modifications, provided by the human agent, to the cart associated with the order;
   receiving text input provided by the human agent in an input area that causes the software agent to provide the text input in the input area as a verbal response to the customer; or any combination thereof.

5. The method of claim 1, further comprising:
   receiving, by the software agent, an additional utterance from the customer;
   converting the additional utterance to additional text;

providing, to the software agent, the additional text;
modifying, by the software agent, the order based at least in part on the additional text to create a modified order, the modifying comprising:
adding an item to the order;
modifying a previously added item in the order; or any combination thereof; and
verbally providing, by the software agent, a response to the customer based at least in part on the additional text.

6. The method of claim 5, further comprising:
displaying, by the point-of-sale device, the additional text; and
displaying, by the point-of-sale device, the modified order.

7. The method of claim 1, further comprising:
determining, by the software agent, that the customer has completed the order;
processing order data associated with the order; and
initiating fulfillment of the order.

8. A server comprising: one or more processors; and one or more non-transitory computer readable media storing instructions executable by the one or more processors to perform operations comprising:
training a software agent comprising a machine learning algorithm using conversation data that includes hundreds of thousands of conversations;
after training the software agent, deploying the software agent on the server;
receiving, by the software agent, an utterance from a customer, the software agent trained to engage in a conversation with the customer to take an order;
creating, via the software agent, a cart associated with the order;
converting, via the software agent, the utterance to text;
providing, to an encoder of a natural language processing pipeline, as structured data: an order context including an interaction history between the software agent and the customer; and a conversation state;
predicting, by the encoder, based on the text and the structured data, an utterance vector;
determining, based at least in part on the utterance vector, that the software agent is untrained to respond to the text;
establishing a connection between:
the server hosting the software agent; and
a point-of-sale device that is associated with a human agent; receiving, from the human agent, a modification to order data displayed by the point-of-sale device;
resuming, by the software agent and based at least in part on the modification to the order data, the conversation with the customer, wherein the human agent does not directly interact with the customer during the conversation between the software agent and the customer; and
after determining, by the software agent, that the customer has completed the order, retraining the software agent based at least in part on:
the conversation between the software agent and the customer;
the text;
a content of the cart; and the modification made by the human agent, the retraining causing an improvement in an accuracy of the software agent in order taking.

9. The server of claim 8, further comprising: providing, to the software agent, the modification to the order data.

10. The server of claim 8, wherein resuming, by the software agent and based at least in part on the modification to the order data, the conversation with the customer comprises: verbally providing, by the software agent, a response to the customer based at least in part on the modification to the order data.

11. The server of claim 8, wherein receiving, from the human agent, the modification to the order data comprises:
receiving one or more edits, provided by the human agent, to the text;
receiving one or more modifications, provided by the human agent, to the cart associated with the order;
receiving text input provided by the human agent in an input area that causes the software agent to provide the text input in the input area as a verbal response to the customer; or any combination thereof.

12. The server of claim 8, further comprising:
receiving, by the software agent, an additional utterance from the customer;
converting the additional utterance to additional text;
providing, to the software agent, the additional text;
modifying, by the software agent, the order based at least in part on the additional text to create a modified order, the modifying comprising:
adding an item to the order;
modifying a previously added item in the order; or any combination thereof; and
verbally providing, by the software agent, a response to the customer based at least in part on the additional text.

13. The server of claim 12, further comprising: displaying, by the point-of-sale device, the additional text; and displaying, by the point-of-sale device, the modified order.

14. The server of claim 8, further comprising:
determining, by the software agent, that the customer has completed the order; processing order data associated with the order; and
initiating fulfillment of the order.

15. A non-transitory memory device to store instructions executable by one or more processors to perform operations comprising:
training a software agent comprising a machine learning algorithm using conversation data that includes hundreds of thousands of conversations;
after training the software agent, deploying the software agent on a server;
receiving, by the software agent, an utterance from a customer, the software agent trained to engage in a conversation with the customer to take an order;
creating, via the software agent, a cart associated with the order;
converting, via the software agent, the utterance to text;
providing, to an encoder of a natural language processing pipeline, as structured data: an order context including an interaction history between the software agent and the customer; and a conversation state;
predicting, by the encoder, based on the text and the structured data, an utterance vector;
determining, based at least in part on the utterance vector, that the software agent is untrained to respond to the text;
establishing a connection between:
the server hosting the software agent; and
a point-of-sale device that is associated with a human agent;
receiving, from the human agent, a modification to order data displayed by the point-of-sale device;

resuming, by the software agent and based at least in part on the modification to the order data, the conversation with the customer, wherein the human agent does not directly interact with the customer during the conversation between the software agent and the customer; and after determining, by the software agent, that the customer has completed the order, retraining the software agent based at least in part on:
- the conversation between the software agent and the customer;
- the text;
- a content of the cart; and the modification made by the human agent, the retraining causing an improvement in an accuracy of the software agent in order taking.

16. The non-transitory memory device of claim 15, further comprising: providing, to the software agent, the modification to order data.

17. The non-transitory memory device of claim 16, wherein resuming, by the software agent and based at least in part on the modification to the order data, the conversation with the customer comprises: verbally providing, by the software agent, a response to the customer based at least in part on the modification to the order data.

18. The non-transitory memory device of claim 15, wherein receiving, from the human agent, the modification to the order data comprises:
- receiving one or more edits, provided by the human agent, to the text;
- receiving one or more modifications, provided by the human agent, to a cart associated with the order;
- receiving text input provided by the human agent in an input area that causes the software agent to provide the text input in the input area as a verbal response to the customer; or any combination thereof.

19. The non-transitory memory device of claim 15, further comprising:
- receiving, by the software agent, an additional utterance from the customer;
- converting the additional utterance to additional text;
- providing, to the software agent, the additional text;
- modifying, by the software agent, the order based at least in part on the additional text to create a modified order, the modifying comprising: adding an item to the order; modifying a previously added item in the order; or any combination thereof; and
- verbally providing, by the software agent, a response to the customer based at least in part on the additional text.

20. The non-transitory memory device of claim 15, further comprising:
- determining, by the software agent, that the customer has completed the order; processing order data associated with the order; and
- initiating fulfillment of the order.

* * * * *